United States Patent
Ainge

(10) Patent No.: US 10,405,472 B2
(45) Date of Patent: Sep. 10, 2019

(54) AGRICULTURAL GROUND ENGAGING CHAIN

(71) Applicant: Hard Metals Australia Pty Limited, New South Wales (AU)

(72) Inventor: Stephen Charles Ainge, New South Wales (AU)

(73) Assignee: Hard Metals Australia Pty Limited (AU)

( * ) Notice: Subject to any disclaimer, the term of this patent is extended or adjusted under 35 U.S.C. 154(b) by 101 days.

(21) Appl. No.: 15/123,902

(22) PCT Filed: Mar. 3, 2015

(86) PCT No.: PCT/AU2015/050086
§ 371 (c)(1),
(2) Date: Sep. 6, 2016

(87) PCT Pub. No.: WO2015/131246
PCT Pub. Date: Sep. 11, 2015

(65) Prior Publication Data
US 2017/0013770 A1    Jan. 19, 2017

(30) Foreign Application Priority Data

Mar. 3, 2014   (AU) .................................. 2014900698

(51) Int. Cl.
*A01B 23/06*        (2006.01)
*A01B 21/08*        (2006.01)

(52) U.S. Cl.
CPC .............. *A01B 23/06* (2013.01); *A01B 21/08* (2013.01)

(58) Field of Classification Search
CPC .......... A01B 23/00; A01B 23/06; A01B 61/00
See application file for complete search history.

(56) References Cited

U.S. PATENT DOCUMENTS

| 358,246 A | * | 2/1887 | Arnett .................... A01B 23/06 172/604 |
| 3,123,154 A | | 3/1964 | Boyle |

(Continued)

FOREIGN PATENT DOCUMENTS

| AU | 2007216912 A1 | 4/2008 |
| CN | 102187752 A | 9/2011 |

(Continued)

OTHER PUBLICATIONS

International Search Report for Application No. PCT/AU2015/050086 dated Mar. 25, 2015.

(Continued)

*Primary Examiner* — Tara Mayo-Pinnock
(74) *Attorney, Agent, or Firm* — Lerner, David, Littenberg, Krumholz & Mentlik, LLP

(57) ABSTRACT

A link assembly (3) for an agricultural ground engaging chain (1) including a plurality of said link assemblies (3), the link assembly including: a first component (7) having a first clamping portion (21) and a first link portion (13) for linking with a link portion of an adjacent link assembly; a second component (9) having a second clamping portion (27) and a second link portion (15) for linking with a link portion of an adjacent link assembly; a resilient harrow member (5), wherein the resilient harrow member (5) is elastically deformable; and at least one fastening element (11). When the link assembly (3) is assembled, the resilient harrow member (5) is clamped between the first clamping portion (21) and the second clamping portion (27) under an applied pressure, elastically deforming to enable engagement of the at least one fastening element, whereby upon release of the applied pressure, the resultant elastic stress in the harrow member (5) urges the first (7) and second (9) components to (Continued)

bear against the fastening element (11) to retain the components of the link assembly (3) together.

19 Claims, 32 Drawing Sheets

(56) References Cited

U.S. PATENT DOCUMENTS

| | | | |
|---|---|---|---|
| 3,576,216 A | 4/1971 | Tanke | |
| 3,690,385 A | 9/1972 | Weiss | |
| 4,577,699 A * | 3/1986 | Rottinghaus | A01B 61/04 172/570 |
| 7,607,489 B2 * | 10/2009 | Kelly | A01B 23/06 172/311 |
| 7,963,345 B1 * | 6/2011 | Hicks | A01B 21/08 172/579 |
| 8,662,195 B2 * | 3/2014 | Hicks | A01B 21/08 172/579 |
| 2008/0314606 A1 | 12/2008 | Kelly et al. | |
| 2011/0220375 A1 | 9/2011 | Connell, Jr. et al. | |
| 2013/0062085 A1 | 3/2013 | Connell et al. | |

FOREIGN PATENT DOCUMENTS

| | | |
|---|---|---|
| CN | 102379170 A | 3/2012 |
| CN | 102996598 A | 3/2013 |
| EP | 2160936 A1 | 3/2010 |
| SU | 982551 A2 | 12/1982 |
| UA | 35117 U | 8/2008 |

OTHER PUBLICATIONS

European Search Report for Application No. PCT/AU2015/050086 dated Jan. 19, 2018, pp. 1-11.
Office Action for Chinese Application No. 201580011492.7 dated Mar. 29, 2018.
Russian Federation Search Report for Russian Application 2016136641 completed Aug. 16, 2018.

* cited by examiner

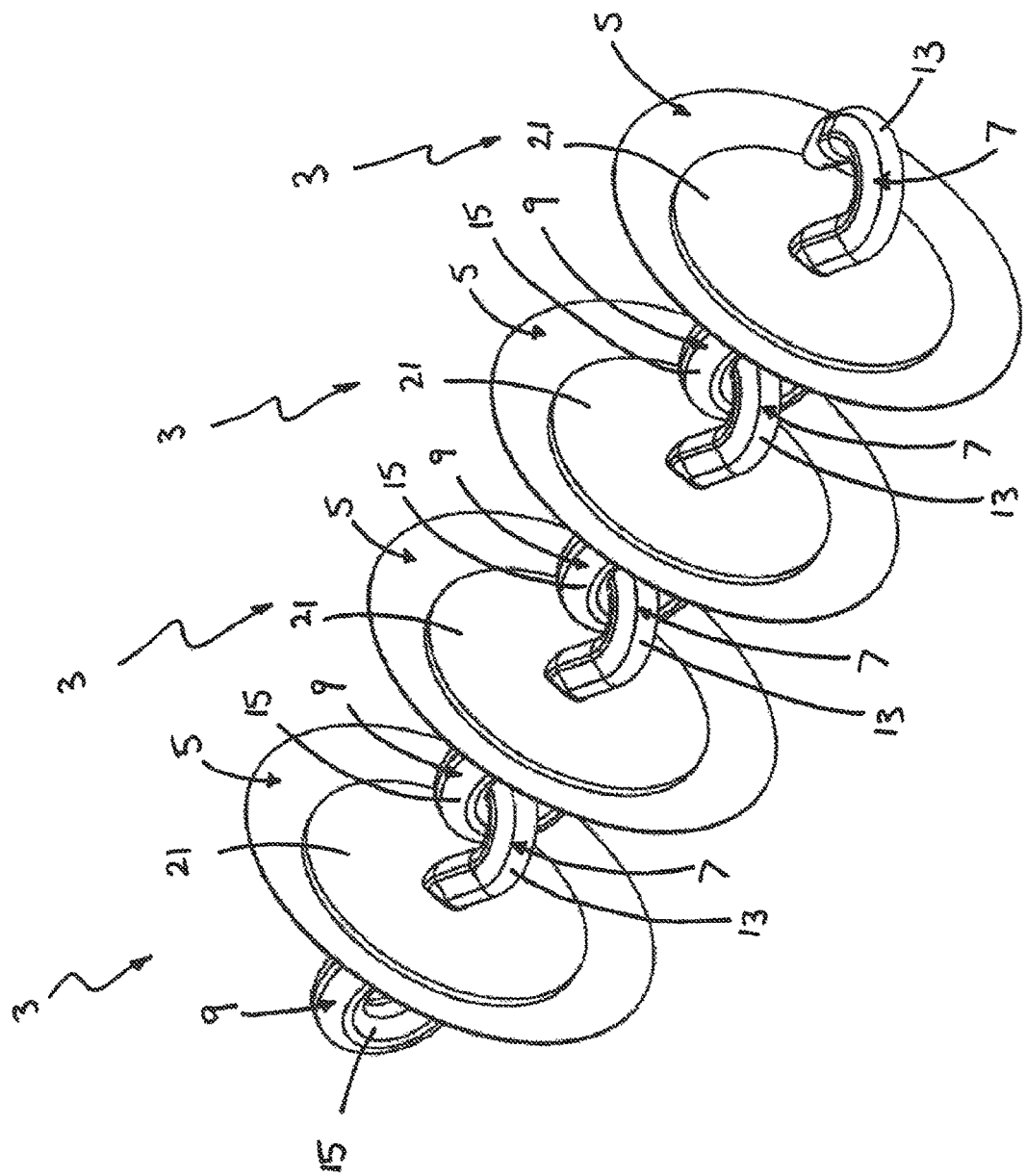
Fig. 1

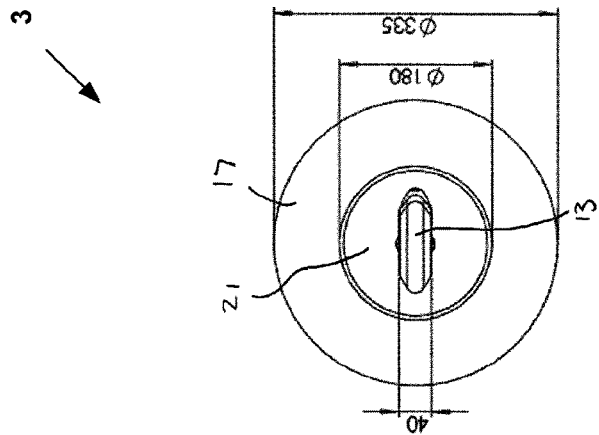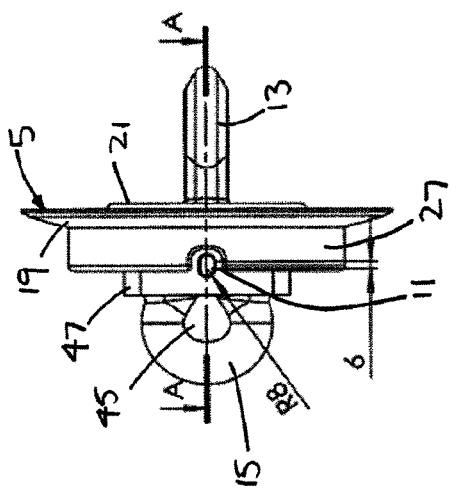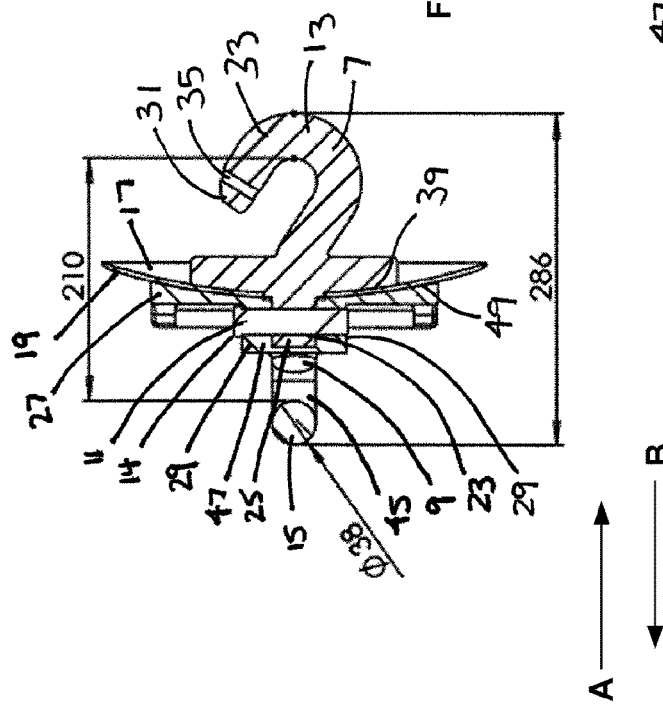

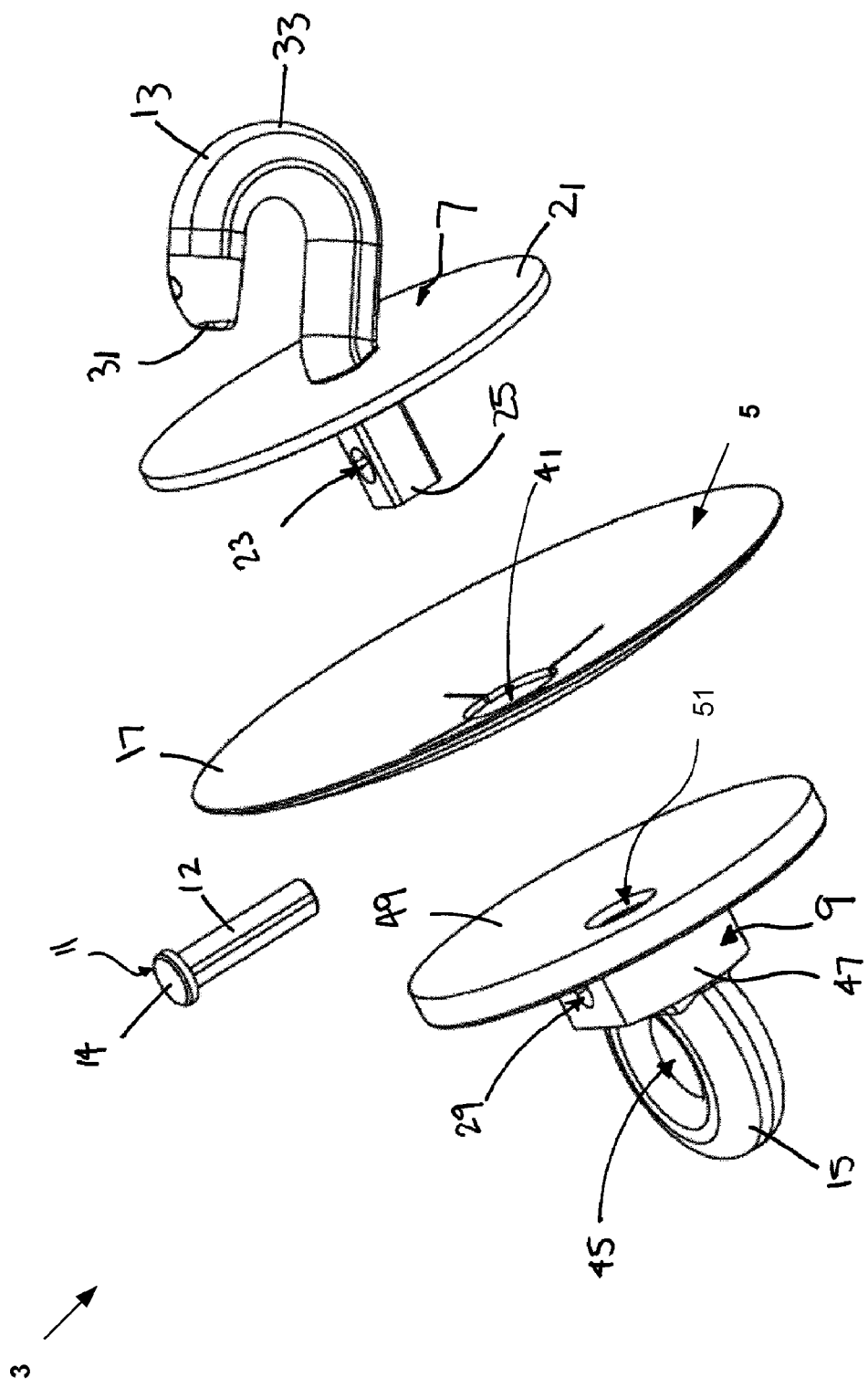

A ⟶ ⟵ B

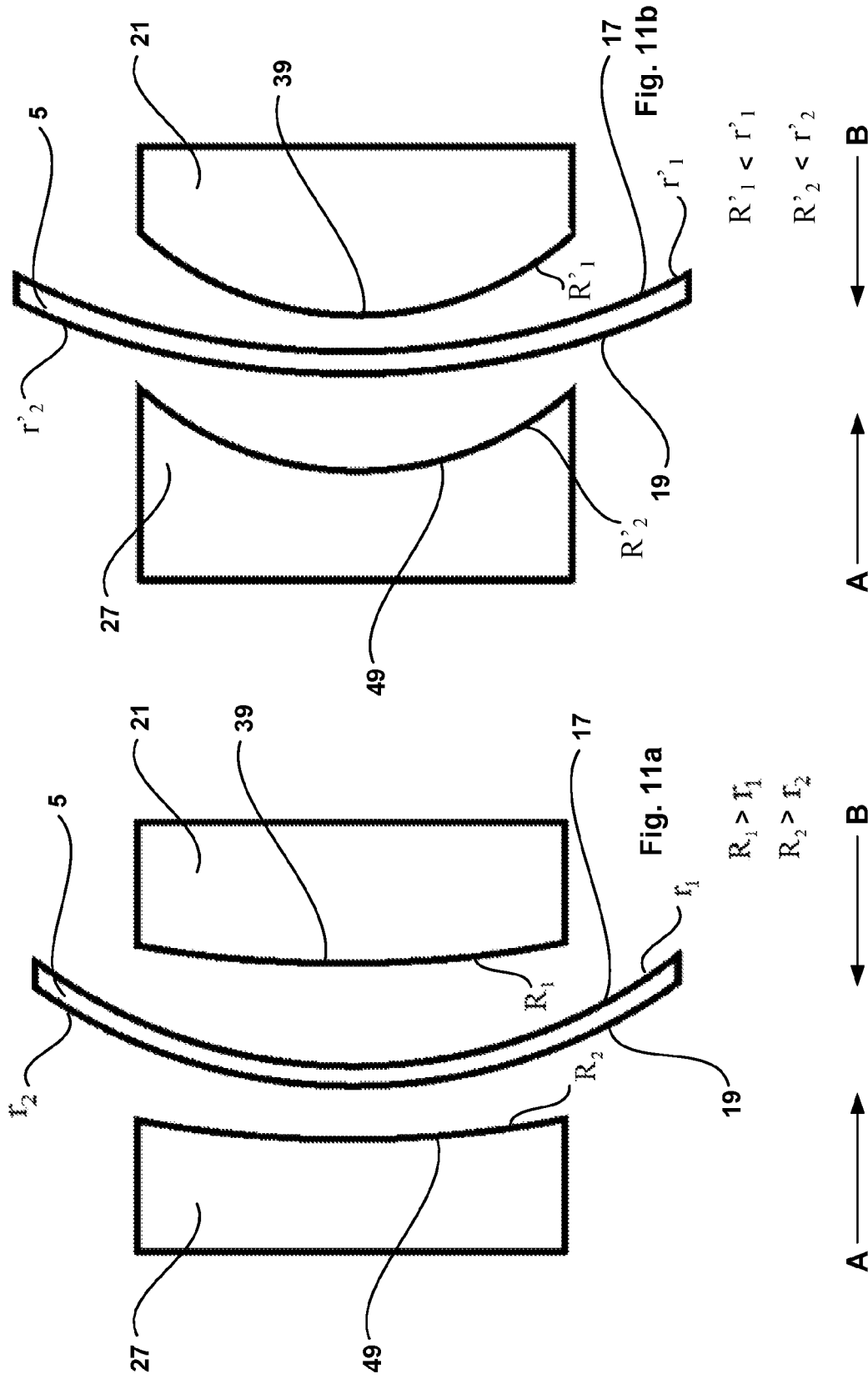

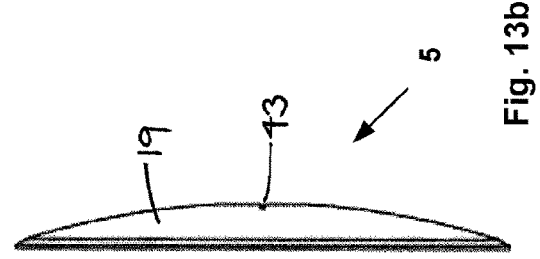
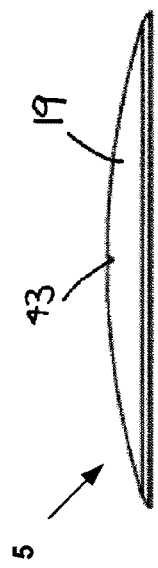
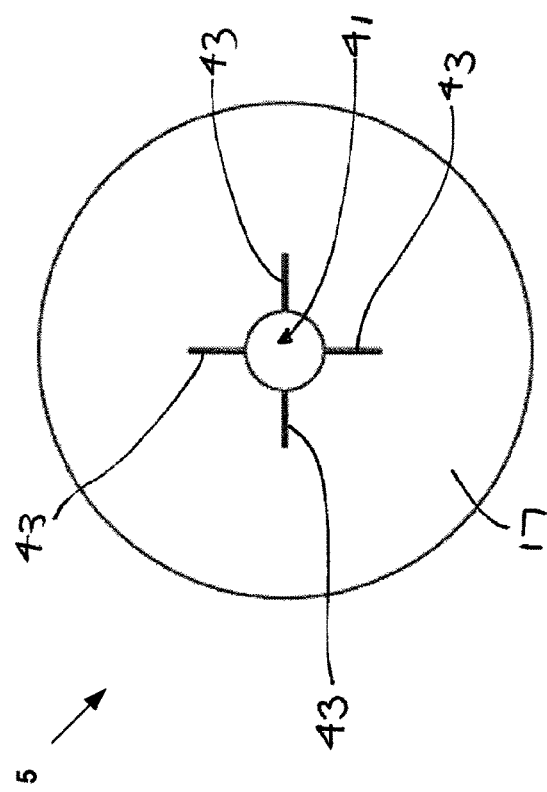

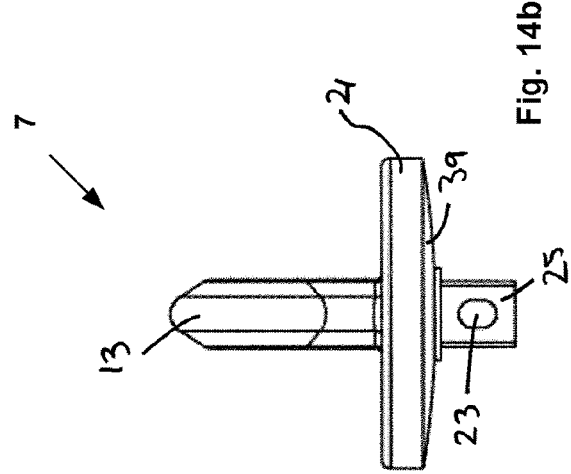
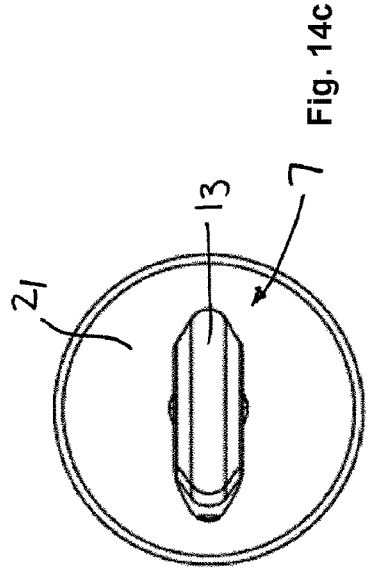
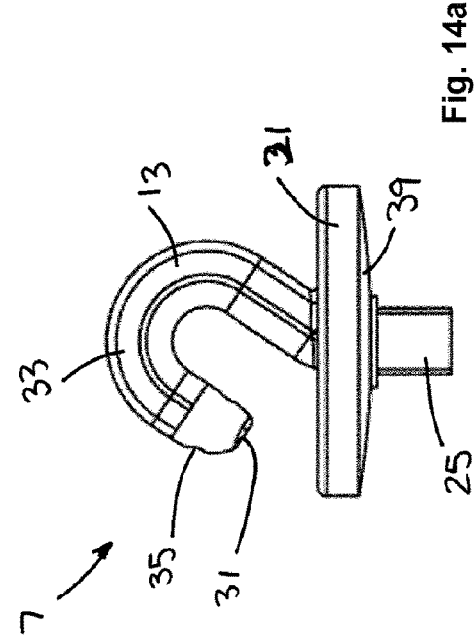

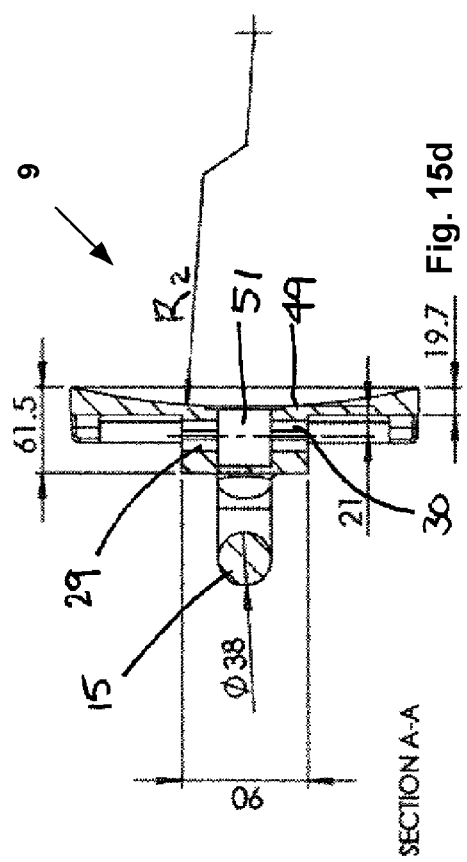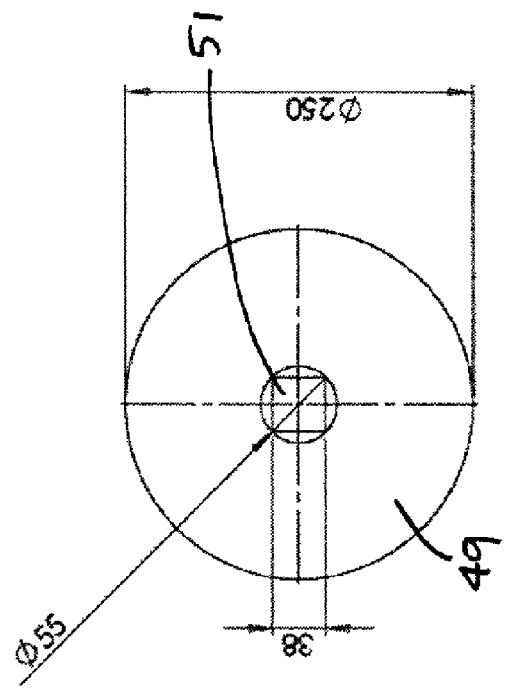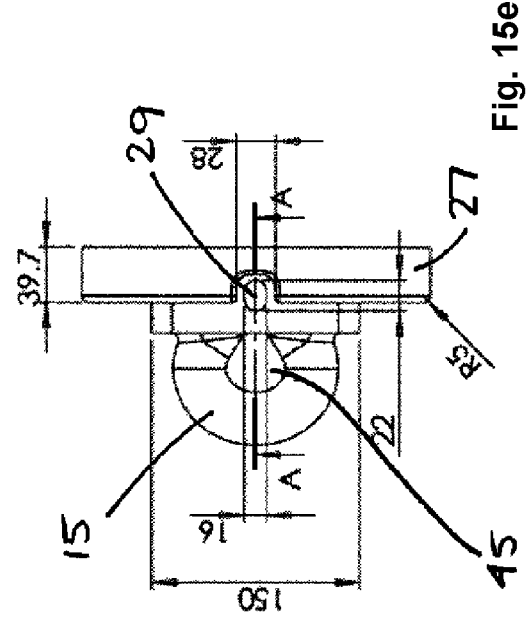

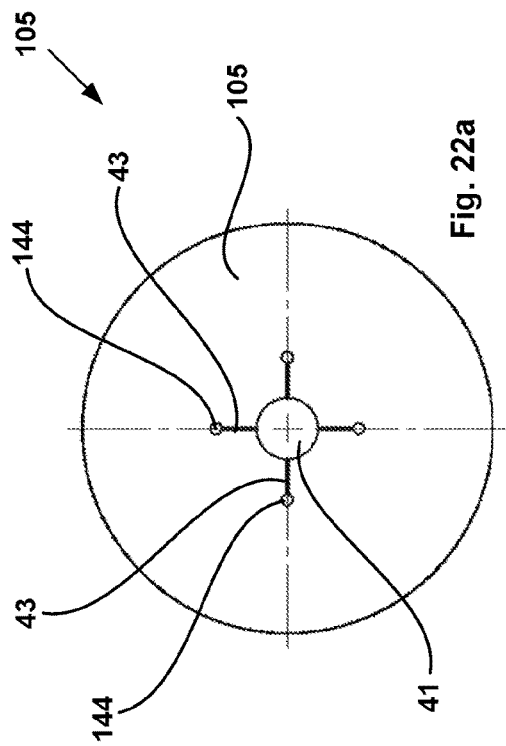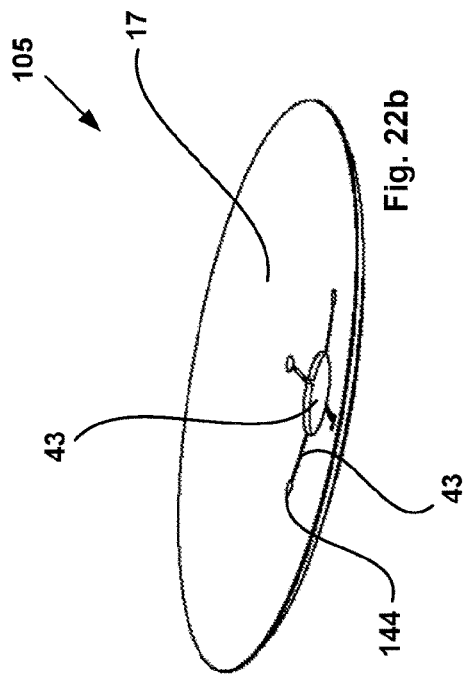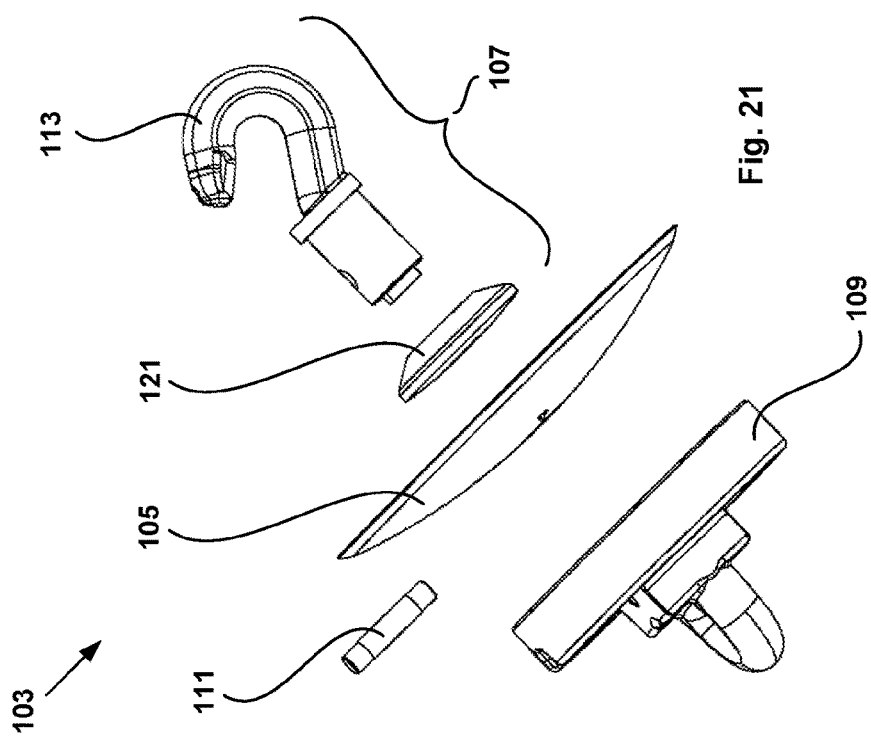

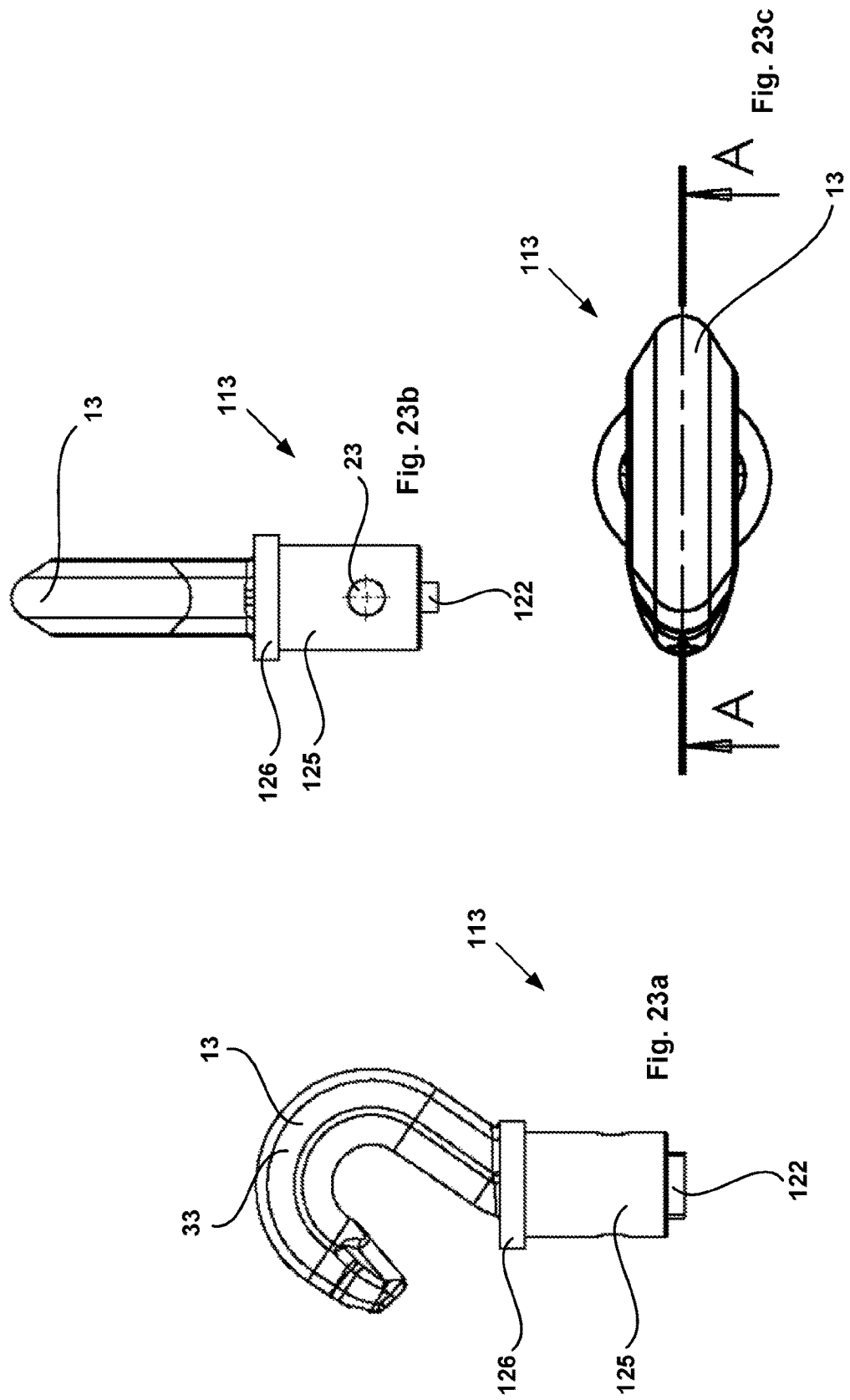

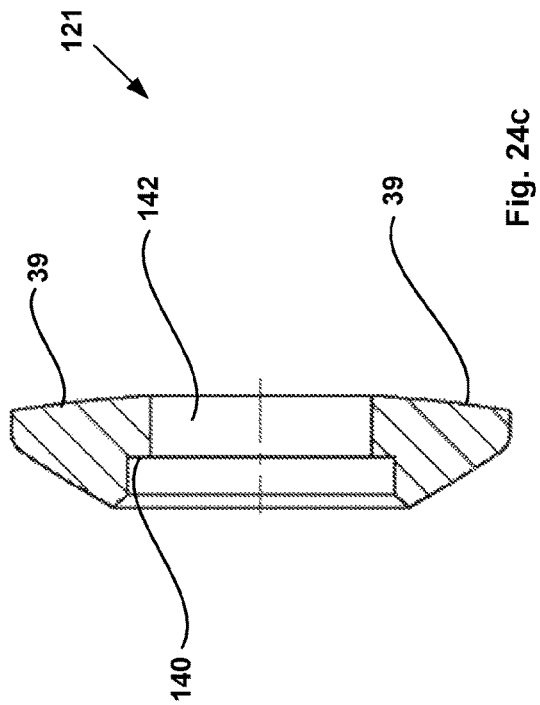
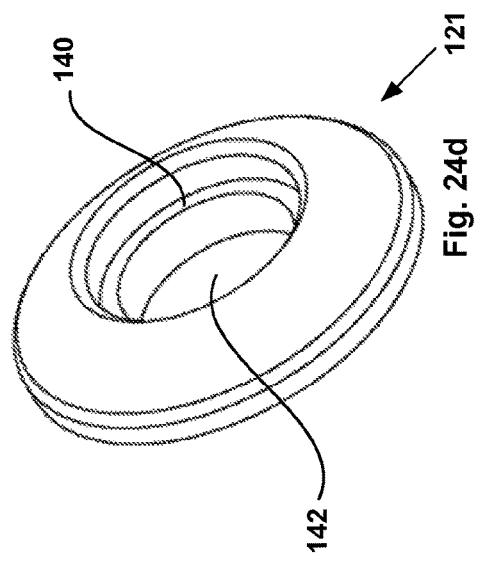
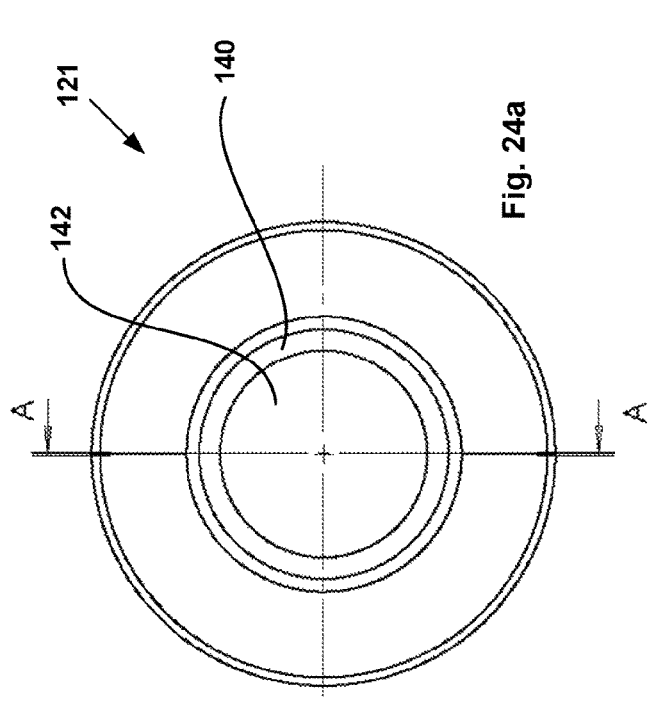
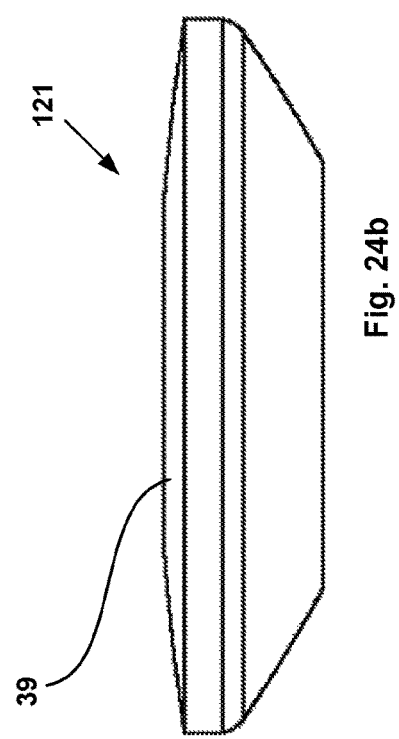

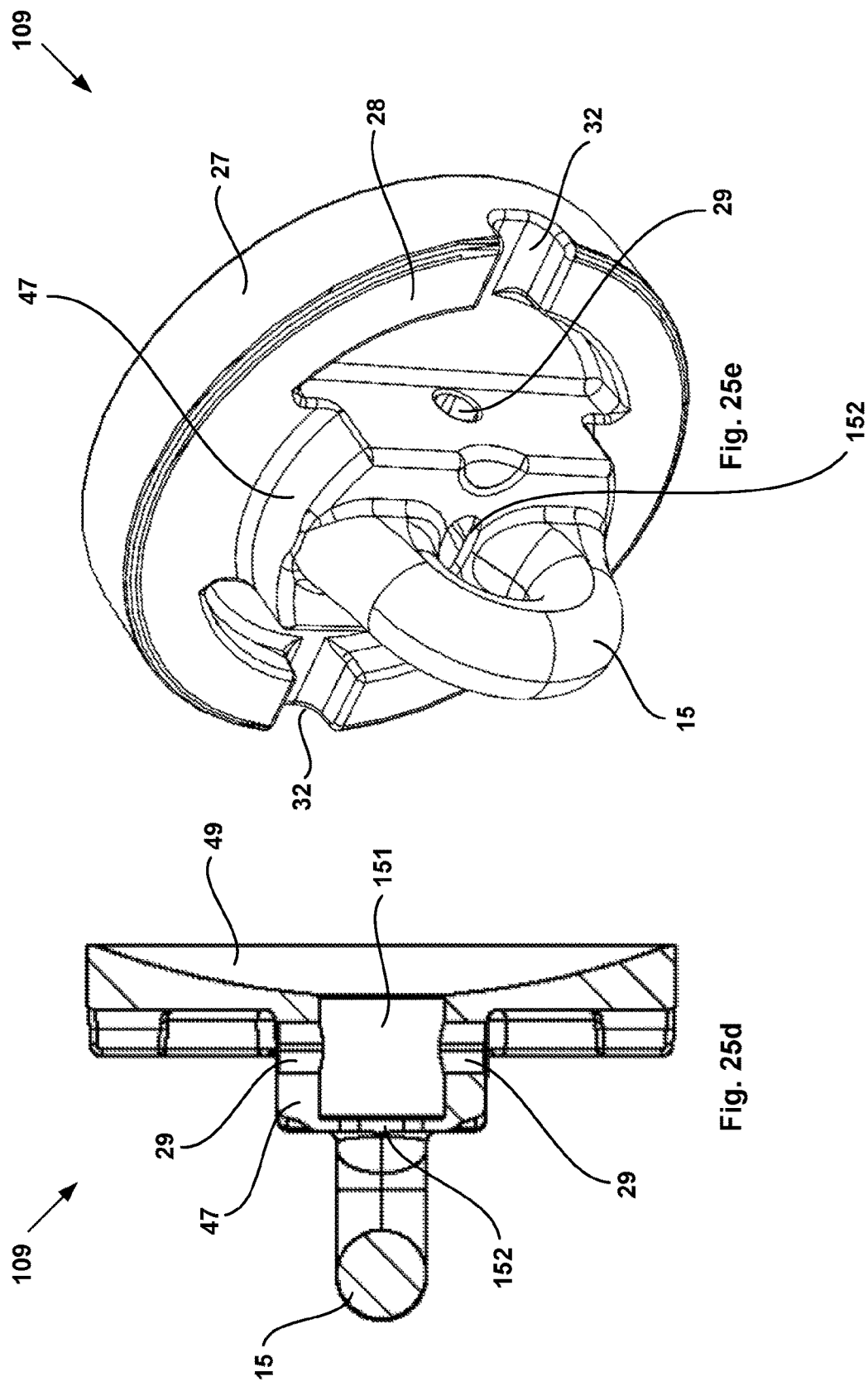

AGRICULTURAL GROUND ENGAGING CHAIN

CROSS-REFERENCE TO RELATED APPLICATION

This application is a national phase entry under 35 U.S.C. § 371 of International Application No. PCT/AU2015/050086, filed Mar. 3, 2015, which claims priority to Australian Patent Application No. 2014900698, filed Mar. 3, 2014, the disclosures of which are incorporated herein by reference.

FIELD OF THE INVENTION

The present disclosure relates to agricultural equipment, in particular a harrow for preparing soil for agriculture. The present disclosure has particular relevance to agricultural equipment of the type including a chain of linked harrow members.

BACKGROUND OF THE INVENTION

Harrows have been used by farmers to assist in preparation of soil for farming. This can include breaking up the soil, furrowing it, and depositing the broken up material into the ground. It may also include uprooting and breaking stubble from the previous harvest or other plant material, such as weeds.

It is known to provide harrows that include a plurality of discs (harrow members) linked together to form a chain. The chain is pulled along the ground surface whereby the discs roll and engage the ground to break the soil and other material therein. Typically, the surfaces of the discs are at an angle to the direction of travel to provide an angle of attack between the discs and the soil.

Such harrows can be mechanised, with the chain of discs extending between two sides of a frame, with the frame towed by a tractor or other farm equipment. Such a known type of harrow is described in Australian patent no. 2007216912. In this prior art, each link in the chain includes a harrow disc, and a pair of link portions, such as a hook portion and a loop portion, disposed on either side of the harrow disc. To form the chain, the hook is hooked into the loop of an adjacent link, and the chain is tensioned to prevent the links from unhooking and separating. To separate the links, tension is relaxed so the links can be unhooked.

Known systems, such as that described in AU 2007216912 have a chain formed of links where the hook, loop and disc are all integral. For example having the disc, hook portions, and loop portions welded together. In another form, the hook, loop, and disc of a link may be formed by a single casting, forging or other integrally forming technique. This is provided to assist assembly and disassembly for the user, as one needs only to hook and unhook the links.

However where the links are integral, it may be impractical to maintain or repair individual links that are worn or damaged. For example, if a hook portion is broken or damaged, the whole link may need to be discarded even if the loop portion and the harrow disc is still serviceable. Similarly, if the harrow disc is worn or damaged during use, the link may need to be discarded even if the loop portion and hook portion are serviceable.

Furthermore, integral links may result in limitations on methods of manufacture and material properties of the link. It may also lead to a compromise of the required properties of the disc and the materials. For example, the loop and hook portion has a primary function of joining the link together, whereas the harrow disc has the function of impacting with and engaging earth. Thus the harrow disc may wear at a rate much higher than the hook loop and require higher wear resistance and toughness/hardness than the other portions. Thus an integral link or integrally formed link may include a compromise in material properties. There may also be financial costs, as portions of the link may consequently be made of materials or formed by a process that is beyond the practical requirements.

As an example, it is known to manufacture a link with the harrow disc, loop portion, and hook portion in a single casting. Casting a component can produce a weaker component compared to other (and usually more expensive) techniques. As a result, to obtain an acceptable strength for the harrow disc, an integrally formed link made from casting may require the harrow disc to be thicker and heavier compared to, for example only, a forged harrow disc. However, for technical and financial reasons, it may be acceptable for the loop and hook portions to be formed of casting.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

According to a first aspect, the present invention provides a link assembly for an agricultural ground engaging chain including a plurality of said link assemblies, the link assembly including:
  a first component having a first clamping portion and a first link portion for linking with a link portion of an adjacent link assembly;
  a second component having a second clamping portion and a second link portion for linking with a link portion of an adjacent link assembly;
  a resilient harrow member, wherein the resilient harrow member is elastically deformable; and
  at least one fastening element;
  wherein, when the link is assembled:
  the resilient harrow member is clamped between the first clamping portion and the second clamping portion under an applied pressure, elastically deforming to enable engagement of the at least one fastening element, whereby upon release of the applied pressure, the resultant elastic stress in the harrow member urges the first and second components to bear against the fastening element to retain the components of the link assembly together.

The harrow member acts as a compression spring, bearing against respective components to prevent the fastening element from migrating out of position under the action of the rotation of the harrow member as it works the ground.

According to a second aspect, the present invention provides a link assembly for an agricultural ground engaging chain including a plurality of said link assemblies, the link assembly including:
  a first component having at least one first fastener receiving passage, a first clamping portion, and a first link portion for linking with a link portion of an adjacent link assembly;
  a second component having at least one second fastener receiving passage, a second clamping portion, and a second link portion for linking with a link portion of another adjacent link assembly;

a resilient harrow member, wherein the resilient harrow member is elastically deformable; and at least one fastener having a shaft extending along a central shaft axis;

wherein when the link assembly is assembled:

the shaft is located, at least in part, through the first and second fastener receiving passages; and the resilient harrow member is elastically deformed between clamping portions of the first and second components such that the resultant elastic stress in the harrow member causes wall portions of each of the first and second fastener receiving passages to urge against the shaft towards the shaft axis to increase the maximum static frictional force between the wall portions of the first and second fastener receiving passages and the shaft.

Advantageously, the harrow member has a first side and an opposite second side wherein when the link assembly is assembled, the first side faces the clamp portion of the first component and second side faces the clamping portion of the second component.

Preferably, the first link portion and the second link portion are located adjacent respective first and second sides of the harrow member.

The harrow member may be substantially dish-shaped with the first side having a concave surface, and the second side having a convex surface. The hub of the harrow member, or disc, acts are a compression spring, such that if may be deformed under applied pressure, and upon release is urged back to a rest state.

Advantageously, the first clamping portion has a convex surface to nest with the concave surface of the first side of the harrow member, and the second clamping portion has a concave surface to nest with the convex surface of the second side of the harrow member.

According to one embodiment, the radius of curvature (R1) of the convex surface of the first clamping portion is greater than the radius of curvature (r1) of the concave surface of the first side of the harrow member, and the radius of curvature (R2) of the concave surface of the second clamping portion is greater than the radius of curvature (r2) of the convex surface of the second side of the harrow member.

According to an alternative embodiment, the radius of curvature (R'1) of the convex surface of the first clamping portion is less than the radius of curvature (r'1) of the concave surface of the first side of the harrow member, and the radius of curvature (R'2) of the concave surface of the second clamping portion is less than the radius of curvature (r'2) of the convex surface of the second side of the harrow member.

The harrow member in one embodiment is substantially disc-shaped. The first clamping portion may have a convex surface for facing the first side of the harrow member, and the second clamping portion may have a concave surface for facing the second side of the harrow member.

The harrow member preferably includes one or more relief cuts to aid deformation of the harrow member. The relief cuts may be in the form of a cross shaped aperture extending from the first side to the second side of the harrow member. Alternatively, the relief cuts could be referred to slots that extend from a central aperture. The relief cuts may also be score lines.

Advantageously, the first component includes a projecting portion opposite the first link portion, wherein the first fastener receiving passage is disposed in the projecting portion, and the harrow member may include an aperture, wherein when the link assembly is assembled, the first component passes through the harrow aperture, and the projecting portion and the first fastener receiving passage is located adjacent the second side of the harrow member.

Preferably, the second component includes a socket opposite the second link portion, wherein the socket is adapted to receive at least part of the projecting portion, wherein when the link assembly is assembled, at least part of the projecting portion is located in the socket with the first and second fastener receiving passages aligned for locating the shaft.

The first and second link portions are preferably formed of a hook portion or a loop portion. Advantageously, the first link portion is a hook portion and the second link portion is a loop portion.

The hook portion may further include a bore for receiving a retaining pin, wherein when the link assembly is assembled, a first part of a retaining pin is located in the bore and a second part of the retaining pin extends from the bore to reduce or close a gap of the hook.

According to a third aspect, the present invention provides resilient harrow member used in the link assembly for an agricultural ground engaging chain according to any one of the preceding aspects.

According to a fourth aspect, there is provided a resilient harrow member for use in an agricultural ground engaging chain, having a central aperture and a plurality of slot extending radially from the central aperture such as to increase the elastic deformability of the harrow member.

According to a fifth aspect, there is provided an agricultural ground engaging chain including a plurality of link assemblies according to any one of the preceding aspects of the invention.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

The invention will now be described, by way of reference only, with respect to the accompanying drawings, in which:

FIG. 1 is a perspective view of an embodiment of an agricultural ground engaging chain;

FIG. 8a is a side view of a link assembly;

FIG. 8b is a cross-section top view along A-A of the link assembly of FIG. 8a;

FIG. 8c is a front view of the link assembly of FIG. 8a;

FIG. 8d is a front perspective view of the link assembly of FIG. 8a;

FIG. 9 is an exploded perspective view of the link assembly of FIG. 4;

FIG. 11a is a cross-section side view (not to scale) of an embodiment where the radius of curvature of clamping portions is greater than the radius of curvature of the harrow member;

FIG. 11b is a cross-section side view (not to scale) of another embodiment where the radius of curvature of clamping portions is less than the radius of curvature of the harrow member;

FIG. 13a is a front view of an embodiment of a resilient harrow member;

FIG. 13b is a side view of the resilient harrow member of FIG. 13a;

FIG. 13c is a top view of the resilient harrow member of FIG. 13a;

FIG. 13d is a rear view of the resilient harrow member of FIG. 13a;

FIG. 13f is another side view of the resilient harrow member of FIG. 13a;

FIG. 13g is a top view of the resilient harrow member of FIG. 13a;

FIG. 13h is a rear perspective view of the harrow member of FIG. 13a;

FIG. 13i is a front perspective view of the harrow member of FIG. 13a;

FIG. 14a is a top view of an embodiment of a first component;

FIG. 14b is a side view of the first component of FIG. 14a;

FIG. 14c is a front view of the first component of FIG. 14a;

FIG. 14d is a front view of the first component of FIG. 14a;

FIG. 14f is a side view of the first component of FIG. 14a;

FIG. 14g is a perspective view of the first component of FIG. 14a;

FIG. 14h is a front perspective view of the first component of FIG. 14a;

FIG. 15b is a front view of the second component of FIG. 15a;

FIG. 15c is a top view of the second component of FIG. 15a;

FIG. 15d is a top cross-section view of the second component of FIG. 15a along section line A-A;

FIG. 15e is another side view of the second component of FIG. 15a;

FIG. 15f is another front view of the second component of FIG. 15a;

FIG. 15g is a perspective view of the second component of FIG. 15a;

FIG. 15h is another perspective view of the second component of FIG. 15a;

FIG. 16b is rear view of the fastener of FIG. 16a;

FIG. 16c is a top view of the fastener of FIG. 16a;

FIG. 16d is a top rear perspective view of the fastener of FIG. 16a;

FIG. 16e is a top front perspective view of the fastener of FIG. 16a;

FIG. 20b is a cross-section top view along A-A of the link assembly of FIG. 20a;

FIG. 21 is an exploded view of the link assembly of FIG. 17;

FIG. 22a is a front view of a resilient harrow member of the link assembly in FIG. 17;

FIG. 22b is a perspective view of the resilient harrow member of FIG. 22a;

FIG. 23a is a top view of a hook subcomponent of the a first component of the link assembly of FIG. 17;

FIG. 23b is a side view of the hook subcomponent of FIG. 23a;

FIG. 23c is a front view of the hook subcomponent of FIG. 23a;

FIG. 23e is a perspective view of the hook subcomponent of FIG. 23a;

FIG. 23f is an alternative perspective view of the hook subcomponent of FIG. 23a;

FIG. 24a is a front view of a clamping subcomponent of the first component of the link assembly of FIG. 17;

FIG. 24b is a side view of the clamping subcomponent of FIG. 24a;

FIG. 24c is a cross-section side view of the clamping subcomponent of FIG. 24a along section line A-A;

FIG. 24d is a perspective view of the clamping subcomponent of FIG. 24a;

FIG. 25a is a front view of a second component of the link assembly of FIG. 17a;

FIG. 25b is a top view of the second component of FIG. 25a;

FIG. 25c is a side view of the second component of FIG. 25a;

FIG. 25d is a cross-section top view of the second component of FIG. 25a;

FIG. 25e is a rear perspective view of the second component of FIG. 25a;

FIG. 25f is a front perspective view of the second component of FIG. 25a; and

DETAILED DESCRIPTION OF THE EMBODIMENTS

Figure 2:
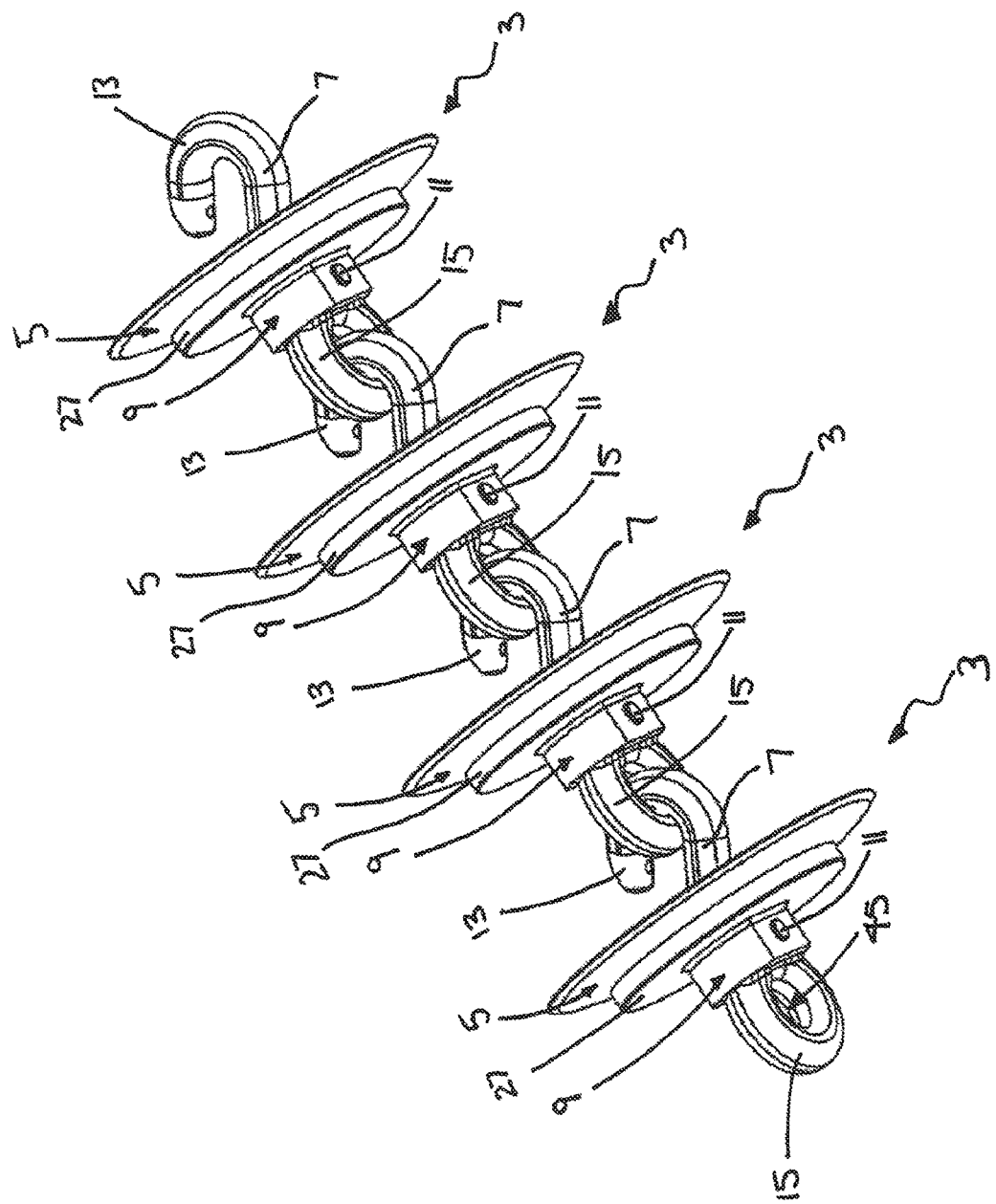
FIG. 2 is another perspective view of the agricultural ground engaging chain of FIG. 1.
Figure 3:
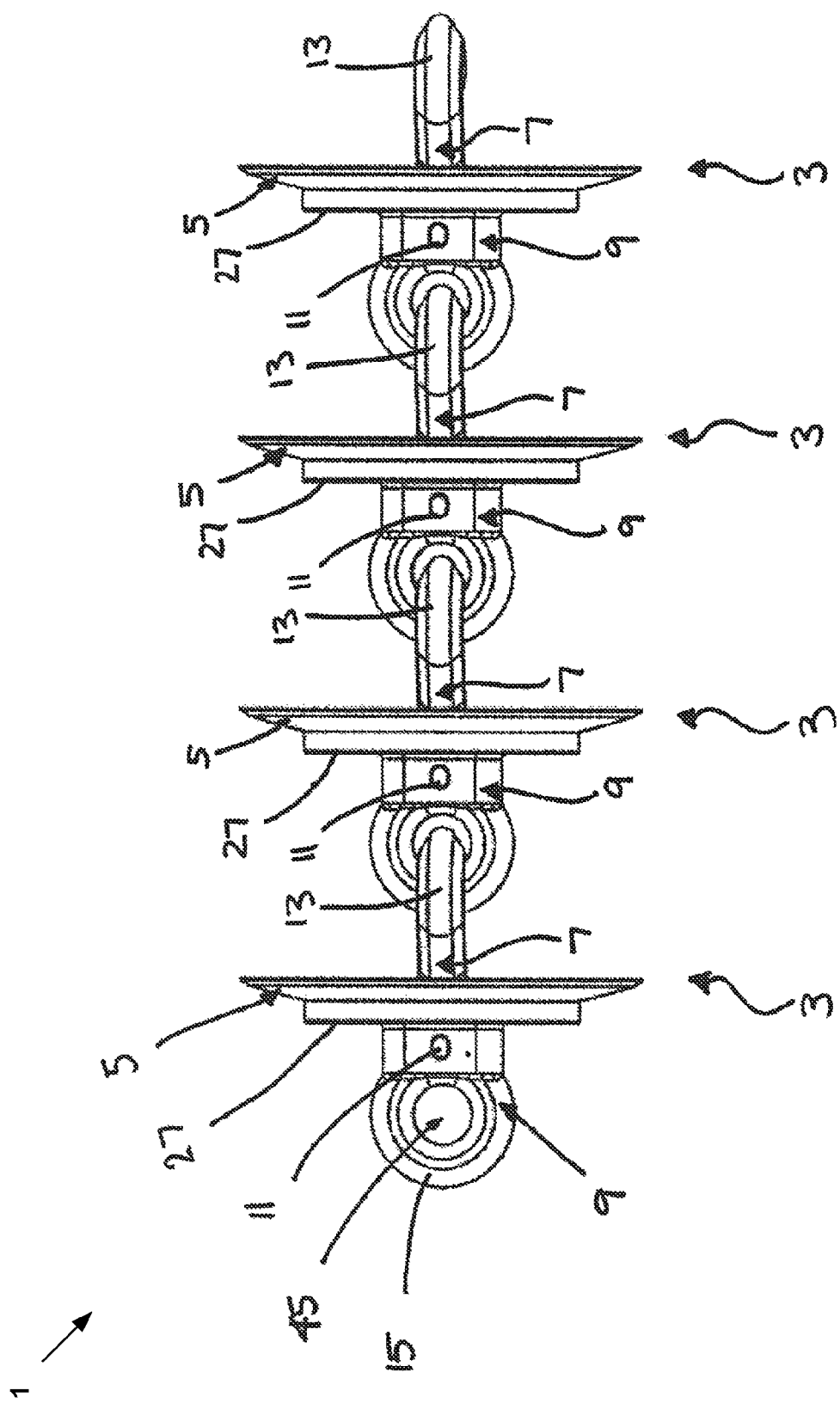
FIG. 3 is a side view of the agricultural ground engaging chain of FIG. 1.
Figure 4:
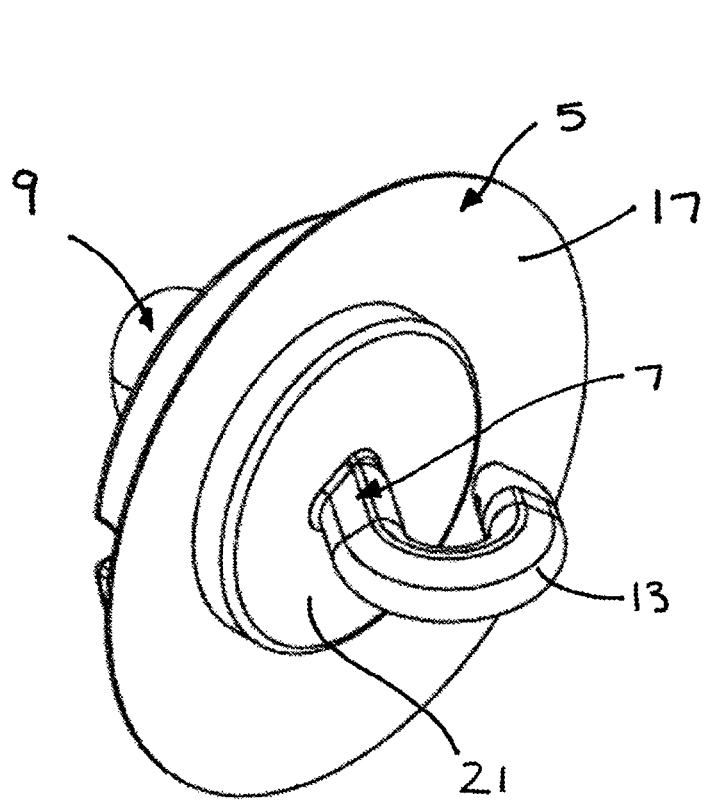
FIG. 4 is a front perspective view of a link assembly of the agricultural ground engaging chain of FIG. 1.
Figure 5:
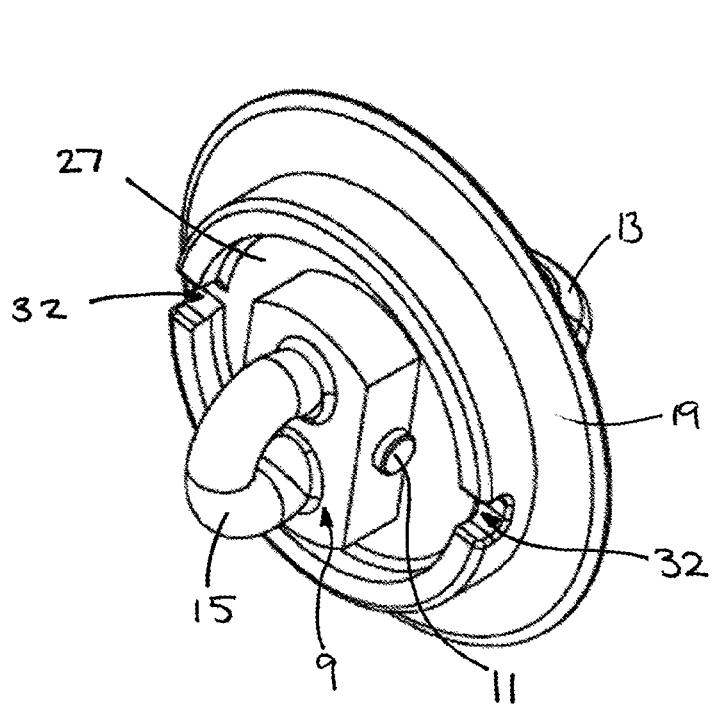
FIG. 5 is a rear perspective view of the link assembly of FIG. 4.
Figure 7:
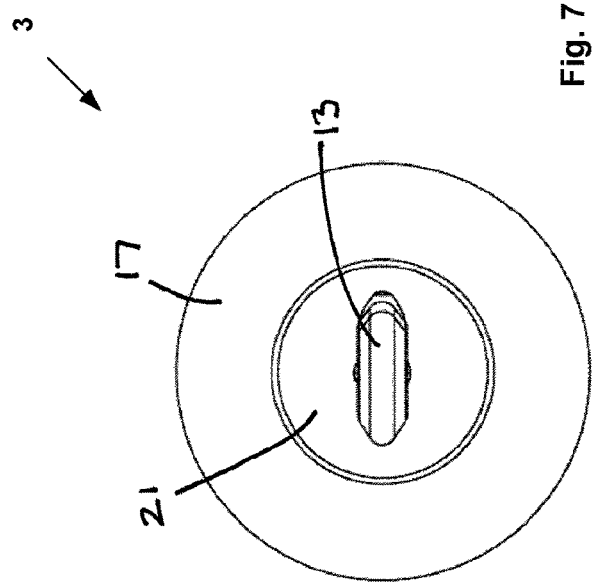
FIG. 7 is a front view of the link assembly of FIG. 4.

FIGS. 1, 2, and 3 illustrate an agricultural ground engaging chain 1 according to one embodiment of the present disclosure. The chain 1 includes a plurality of link assemblies 3, each having a resilient harrow member 5, a first component 7, a second component 9, and a fastening element (such as fastener 11) for assisting in holding or retaining the other components of the link assembly 3 together. The first component 7 includes a first link portion, which in this embodiment is in the form of a hook 13. The second component 9 includes a second link portion, embodied as a loop 15. The hook 13 and loop 15 of each link assembly 3 allows releasable linking to respective hooks 13, and loops 15 of adjacent link assemblies 3 to form the chain 1.

Figure 12:
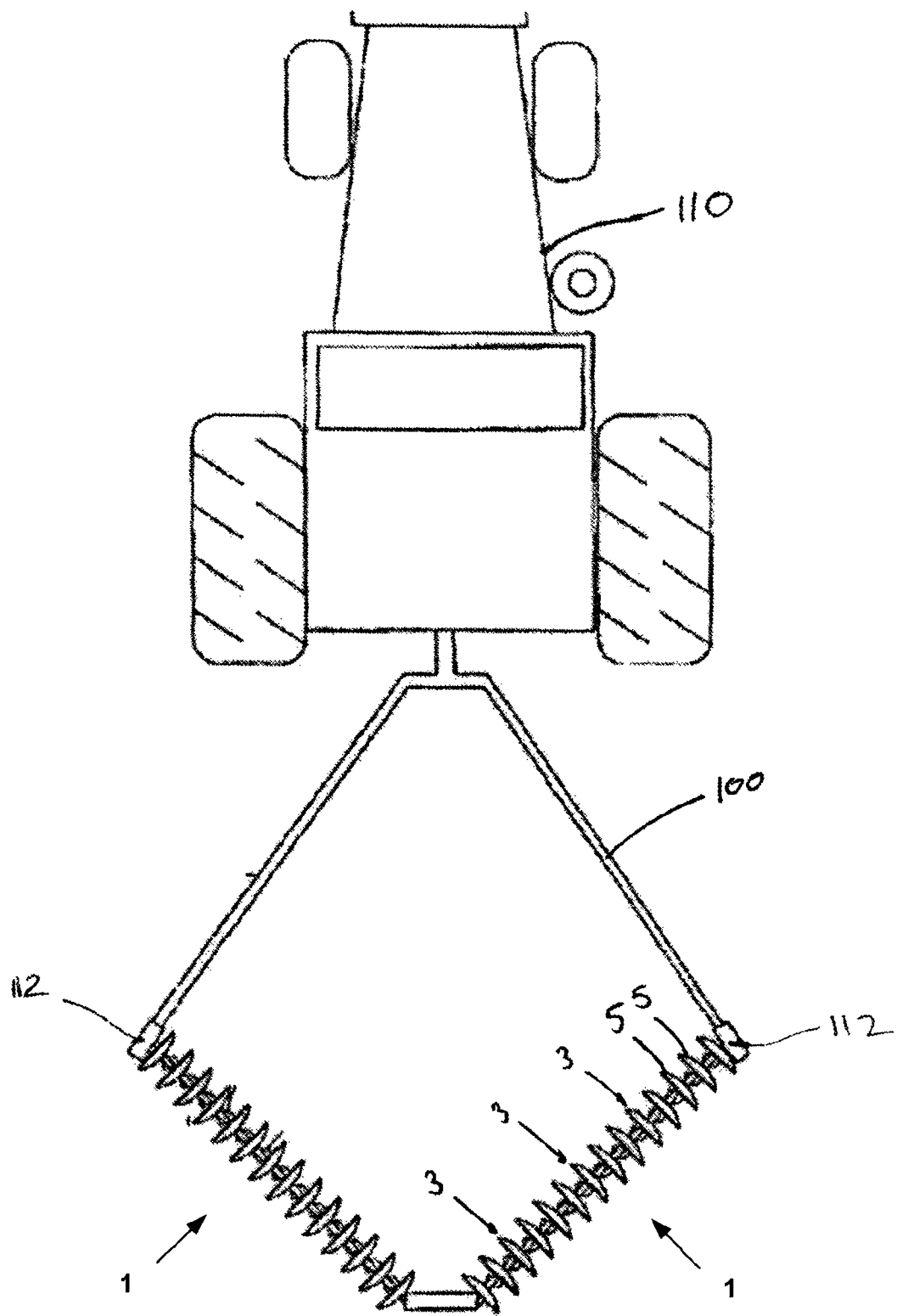
FIG. 12 is a top view of an agricultural ground engaging chain towed behind a tractor.
Figure 13E:
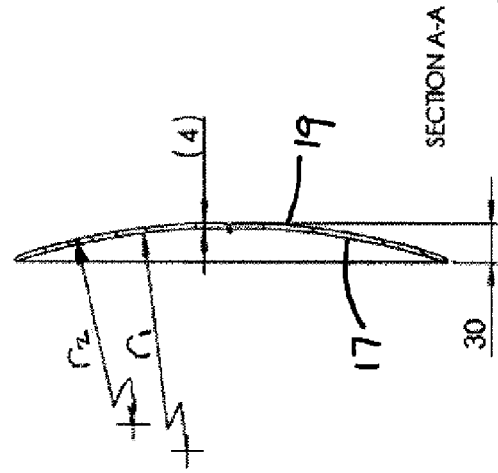
FIG. 13e is a side cross-section view of the resilient harrow member of FIG. 13d along section line A-A.
Figure 13G:
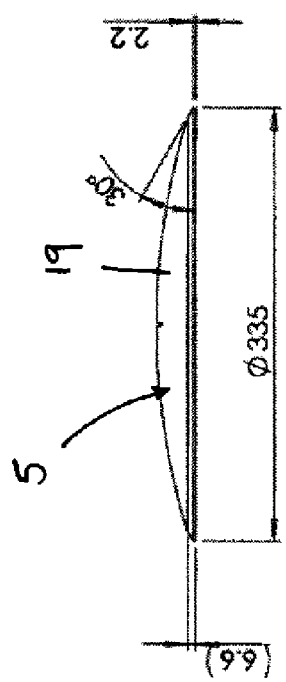
Figure 13D:
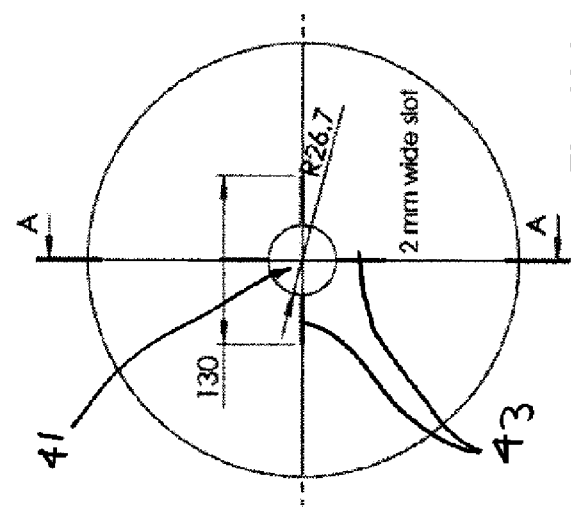
Figure 13F:
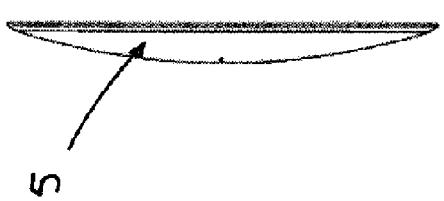
Figure 13H:
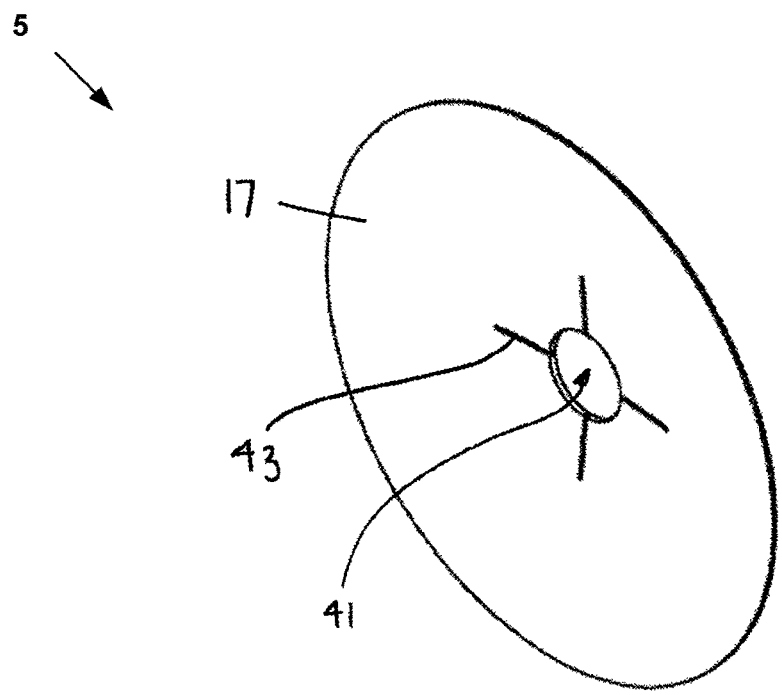
Figure 13I:
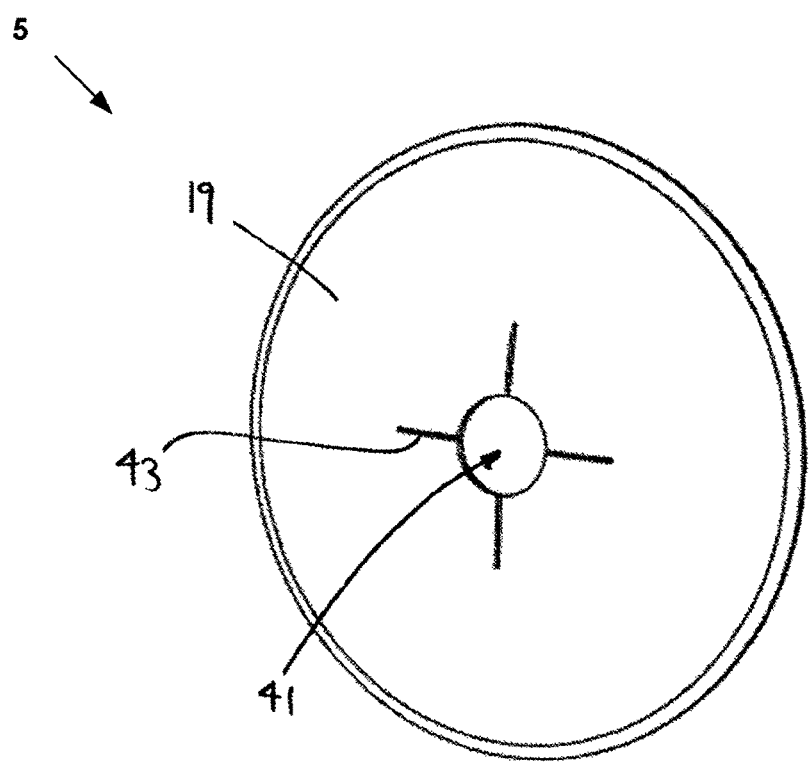
Figure 14F:
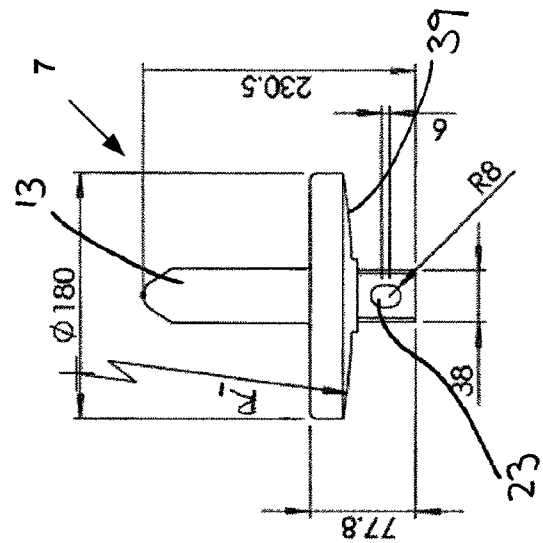
Figure 14D:
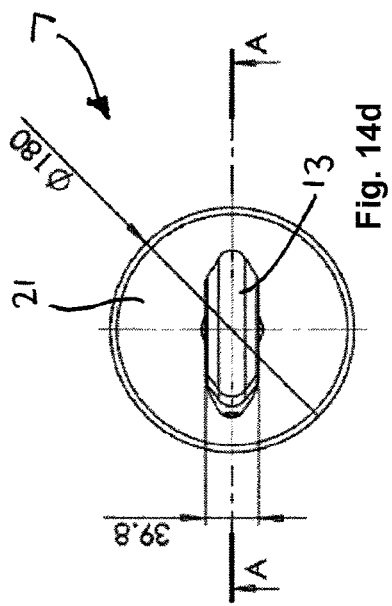
Figure 14E:
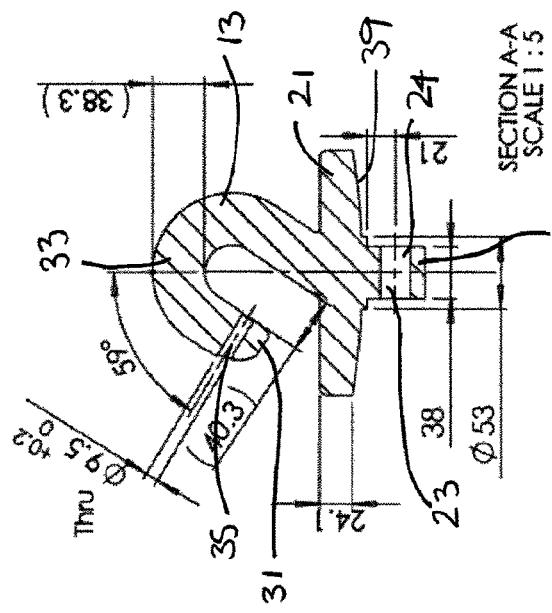
FIG. 14e is top cross-section view of the first component of FIG. 14c along section line A-A.
Figure 14G:
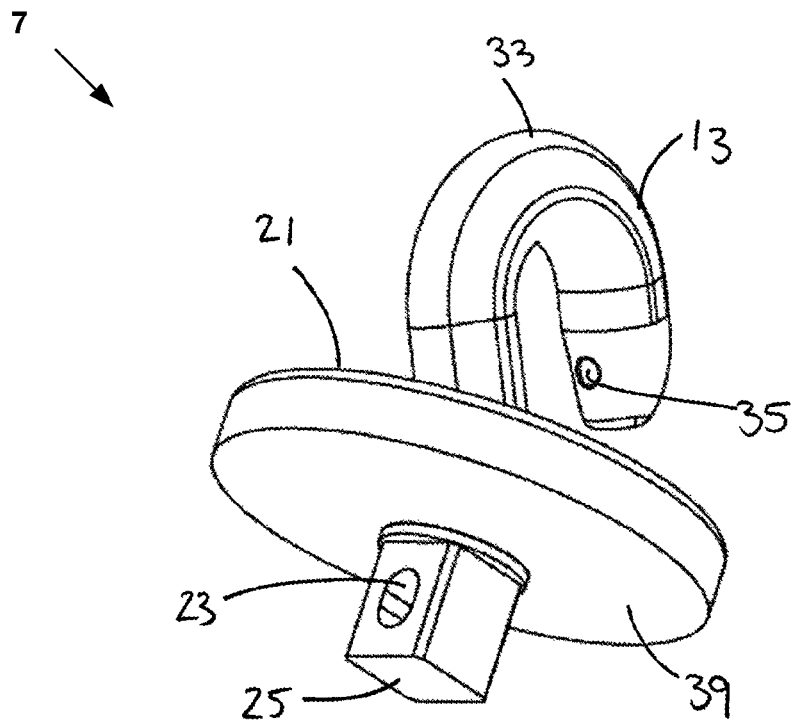
Figure 14H:
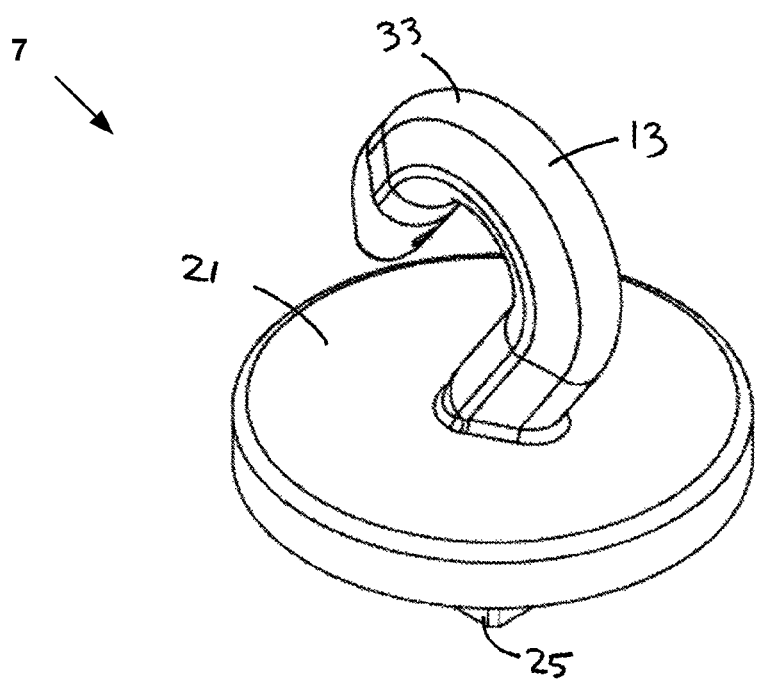

Referring to FIG. 12, the agricultural ground engaging chain 1 is attached to a frame 100, which in turn is pulled by a tractor 110. The ends of the ground engaging chain 1 are attached to free spinning spindles 112, thereby allowing the chain 1 to freely rotate as the harrow members 5 move across the ground.

Figure 6B:
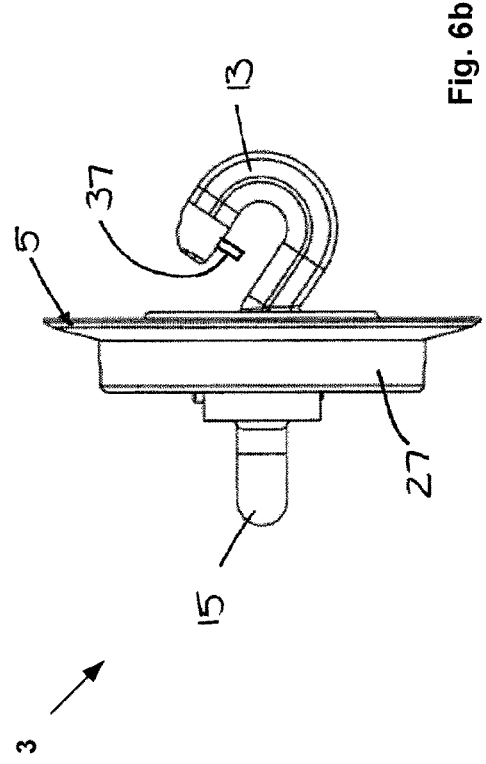
FIG. 6b is a side view of the link assembly of FIG. 4.
Figure 6A:
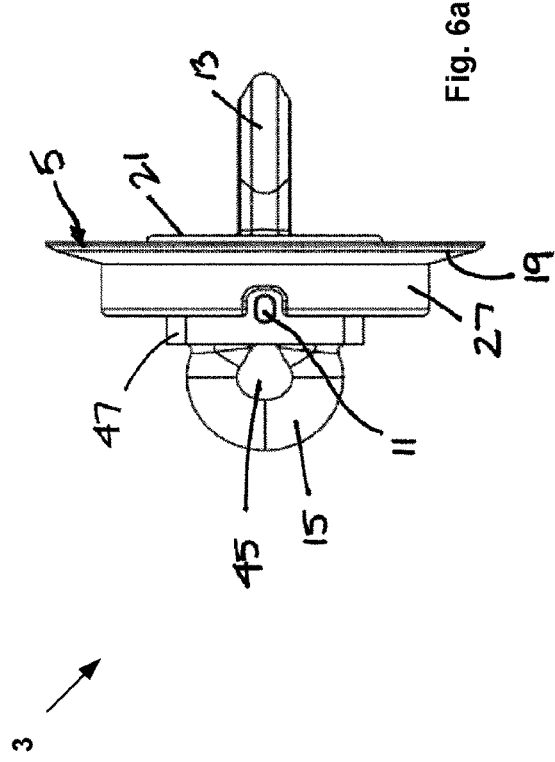
FIG. 6a is a top view of the link assembly of FIG. 4

The chain 1 may be formed by hooking, and if required unhooking, link assemblies 3 to achieve the required length. Once the length is achieved, the chain 1 may be tensioned so that the hooks 13 are suitably taut with the loops 15 to prevent hooks 13 unhooking. Optionally, a retaining pin 37 may be driven into the bore 35 to close or reduce the gap in the hook 13 to prevent unhooking (as shown in FIG. 6b).

To disassemble chain 1 for servicing a particular link assembly 3, the tension in the chain 1 is relieved. If present, the retaining pin 37 is first removed from the particular link assembly 3 (and also from the hook of the adjacent link assembly hooked to the loop 15), thereby opening the gaps of the hooks 13. The link assembly 3 is then removed for servicing, and optionally a replacement link assembly 3 joined in place.

FIGS. 4 to 8 illustrate an assembled link assembly 3 according to a first embodiment. The first component 7, in addition to the first link portion 13, includes a first clamping portion 21, and a first fastener receiving passage 23 located in projecting portion 25. The second component 9, in addition to the second link portion 15, includes a second clamping portion 27, and a second fastener receiving passage 29. The harrow member 5 includes a first side 17, and an opposite second side 19. As best illustrated in FIG. 8b, the first and second sides 17, 19 are clamped between respective first and second clamping portions 21, 27. The fastener 11, having a shaft portion 12 with a central shaft axis is located through the first and second fastener receiving passages 23, 25 to assist in keeping the components of the link assembly 3 together.

When the link assembly 3 is assembled, the resilient harrow member 5 is elastically deformed under applied pressure between the first and second clamping portions 21, 27. As a result the elastic stress in the hub of the harrow member 5 urges the first side 17 against the first clamping portion 21 in direction A, and the second side 19 against the second clamping portion 27 in direction B. Upon release of the pressure, this resultant elastic stress urges the first component 7 and second component 9 in opposite directions away from each other, bearing against the fastener 11 to retain the components of the link assembly 3 together. The forcing apart of the first and second components in turn causes a wall portion 24 of the first fastener receiving passage 23 to urge against the shaft portion 12 towards the shaft axis, and a wall portion 30 of the second fastener receiving passage 29 to also urge against the shaft portion 12 towards the shaft axis (which in this embodiment is perpendicular to direction A and B). That is, this arrangement provides at least a component of normal force between the surface of the shaft portion 12 and respective wall portions of the first and second fastener receiving passages 23, 25. The effect is to increase the maximum static friction force between wall portions of the first and second fastener receiving passages 23, 25 and the shaft portion 12, thereby assisting in retaining the fastener 11 in the fastener receiving passages 23, 25 and maintaining the other components of the link assembly 3 together.

Description of the Components

FIG. 9 is an exploded view of the components of the link assembly 3. Although this embodiment shows four major components, it is to be appreciated variations may include more or less individual components without departing from the concept of this disclosure. For example, the first component 7 may be manufactured in more than one piece that, placed together, form a sub-assembly of the first component 7. Alternatively, multiple pieces may be joined together, for example, welding the pieces together to form the first component. In another alternative, the first component 7 may be integrally formed as one piece. Such variations may of course be applied to the other major components.

Resilient Harrow Member

Referring to FIGS. 13a to 13i, the harrow member 5 is substantially disc-shaped, with a circular edge around the perimeter. This shape allows the harrow member 5 to rotate (i.e. roll) as the chain 1 is pulled across the surface of the soil.

The harrow member 5 in this embodiment is also dish-shaped, with the first side 17 having a concave surface with a radius of curvature ($r_1$) and the second side 19 having a convex surface with a radius of curvature ($r_2$). This general shape may assist in engagement and manipulation of the soil. The shape may also assist in elastic deformation of the harrow member 5, which will be discussed in further detail below.

The resilient harrow member 5 is elastically deformed under pressure from the clamping portions 21, 27. Accordingly it is configured, along with the structure of the other components, to deflect, and with the resultant elastic stress, provide a restoring force/pressure against the clamping portions 21, 27. That is, the resilient harrow member 5 acts like a spring against the clamping portions 21, 27.

In one embodiment, the resilient harrow member 5 is formed of spring steel. An appropriate material may include carbon steel and other alloying elements in small percentages such as Nickel (Ni), Chromium (Cr) and Molybdenum (Mo). In another embodiment, the harrow member 5 is formed by pressing. The harrow member 5 may also be heat treated, including case hardening to increase durability. The heat treatment may be localised to regions of the harrow member 5. For example, it may be heat treated around the circular perimeter of the harrow member 5 where the disc is likely to impact with the soil, rocks, etc., during use. In one embodiment, the centre region of the harrow member 5, such as portions of the first and second sides 17, 19 adjacent and facing the clamping portions 21, 27 may not be treated, or have reduced or different type of treatment to preserve or maintain elastic properties. Whilst this is desirable, it is not a mandatory requirement for the success of the invention.

The harrow member 5 has a central aperture 41 extending between the first side 17 and the second side 19. The harrow member 5 may also be provided with relief cuts 43 to reduce stress in the harrow member 5 when the link assembly 3 is assembled. Thus the relief cuts 43 may reduce the required force/pressure to deform the harrow member 5 so that the first and second receiving passages 23, 29 can be aligned for shaft 12 of the fastener 11 to pass through. In the illustrated embodiment, the relief cuts 43 extend from the first side 17 to the second side 19 of the harrow member 5. Four relief cuts 43 are arranged in a cross pattern, and extend radially from the central aperture 41. It is to be appreciated more or less relief cuts 43 may be provided to change the stiffness of the harrow member. It is also to be appreciated the relief cuts in some embodiments may not extend all the way through the harrow member 5, and for example, be score lines.

In one embodiment, the harrow member 5 is approximately 335 mm in diameter, with the radius of curvature ($r_1$) of the first side 17 is approximately 540 mm, and the radius of curvature ($r_2$) of the second side 19 is approximately 544 mm. The harrow member 5 is approximately 4 mm thick. The relief cuts 43 extend approximately 65 mm from the centre of the disc, with a width of approximately 2 mm. The central aperture 41 has a radius of approximately 26.7 mm.

However, it is appreciated the harrow member 5 may be made with other sizes and dimensions. In one embodiment, components of the link assembly 3 may be compatible with different sized harrow members 5. This may be advantageous, as the first component 7, second component 9, and the fastener 11 may be standardised, but be able to be used with different harrow members as required by the user. This may simplify production, logistics, and lower costs.

In the above described embodiment, the harrow member 5 is disc and dish shaped. However, it is to be appreciated other forms may be used. Importantly, the function of the harrow member is to engage the ground surface when the chain 1 is in use. Therefore other structural features achieving this effect, such as spikes, protrusions, blades etc. may also be used.

First Component

Referring to FIGS. 14*a* to 14*h*, the first component 7 includes a hook 13 for joining with a loop 15 of another link assembly 3. The open hook 13 starts with a narrow point 31 that widens to an arcuate bend 33 that extends towards the first clamping portion 21. Near the narrow point 31 of the hook 13 is a bore 35, with a bore axis generally extending in a direction of the gap of the hook 13. The bore 35 is adapted to receive retaining pin 37, such as a roll pin, which when inserted extends across at least part of the gap of the hook 13. When the hook 13 is joined with a loop 15, the retaining pin 37 may be inserted to close, or substantially close the gap of the hook 13. Advantageously this may prevent separation of the hook 13 and the joined loop 15, even if tension in the chain 1 is relaxed.

The first clamping portion 21 is located in a central region of the first component 7, with a projecting portion 25 extending from the clamping portion 21 on the opposite side to the hook. The first clamping portion 21, in the present embodiment, has a convex surface 39 on the side facing away from the hook 13. The convex surface 39 has a radius of curvature ($R_1$). The convex surface 39 of the first clamping portion 21, when assembled faces towards and, at least in part, abuts the corresponding concave surface of the first side 17 of the harrow member 5.

In the illustrated embodiment, the projecting portion 25 extends with a generally square (rectangular) cross-section. The projecting portion 25 is adapted to pass through the central aperture 41 of the harrow member 5, and be received in the second component 9 as will be discussed in further detail below. The first fastener receiving passage 23 extends through the projecting portion 25. In this embodiment, the first fastener receiving passage 23 extends in a direction substantially perpendicular to the direction that the projecting portion 25 extends. The fastener receiving passage 23 has a cross sectional shape of a stadium (that is two parallel sides joined by semicircular ends), that matches the cross sectional shape of the shaft 12 of the fastener 11.

In one embodiment, the convex surface 39 has a radius of curvature ($R_1$) of approximately 792 mm, and the clamping portion 21 has a diameter of approximately 180 mm.

Second Component

Referring to FIGS. 15*a* to 15*h*, the second component 9 includes a loop 15 for joining with a hook 13 of another link assembly 3. The loop 15 is a substantially circular closed ring, with ring aperture 45 sized to receive the hook 13.

At a central region of the second component 9 is a body portion 47. The second clamping portion 27, is located adjacent the central body portion 47 opposite to the loop 15. The second clamping portion 27, in the present embodiment, has a concave surface 49. The concave surface 49 has a radius of curvature ($R_2$). The concave surface 49 of the second clamping portion 27 when assembled faces towards and, at least in part, abuts the corresponding convex surface of the second side 19 of the harrow member 5.

Extending into the second component 9 from the concave surface 49 is a channel or socket 51. The socket 51 is adapted to receive the projecting portion 25 of the first component 7. The socket extends from the concave surface 49 and into the central body portion 47, as shown in FIG. 8*b*. Thus the second fastener receiving passage 29 passes from at least one side of the body portion 47 through to the socket 51. The second fastener receiving passage 29 extends through the central body portion 47 in a direction perpendicular to direction A and B (as referenced when the link assembly is assembled). Importantly, this allows, when assembled, the first fastener receiving passage 23 of the projecting portion 25 to be aligned with the second fastener receiving passage 29 of the central body portion 47, so that the shaft 12 of the fastener 11 may extend through both the passages 23, 29.

The second fastener receiving passage 29 has a cross sectional shape of a stadium (that is two parallel sides joined by semi circular ends), that matches the cross sectional shape of the shaft 12 of the fastener 11.

The socket 51 has a profile to complement the shape of the projecting portion 25. For example, it may have a square profile to match a similarly shaped projecting portion 25 to assist in alignment of the first and second fastener receiving passage 23, 29. In another embodiment, the projecting portion 25 and socket 51 may have a rectangular cross-section shape so that the projecting portion 25 can only be inserted into the socket 51 in the correct orientation. It is to be appreciated other shapes and forms may also be used, such as a round cross-section, an elliptical cross-section, a keyed cross-section, a circular cross-section with a segment removed, etc.

Figure 15B:
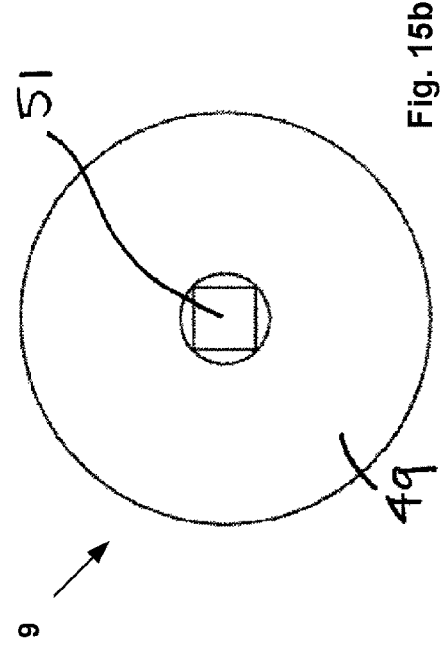
Figure 15C:
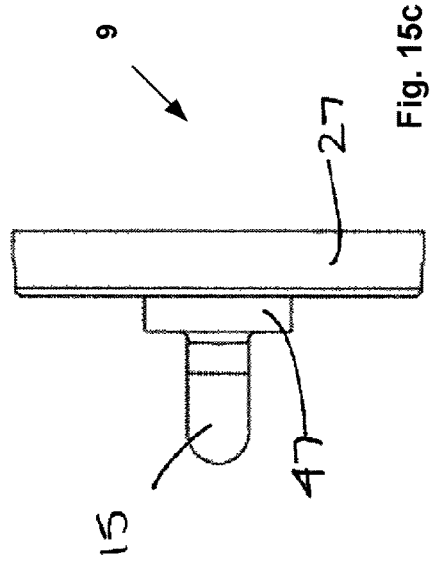
Figure 15A:
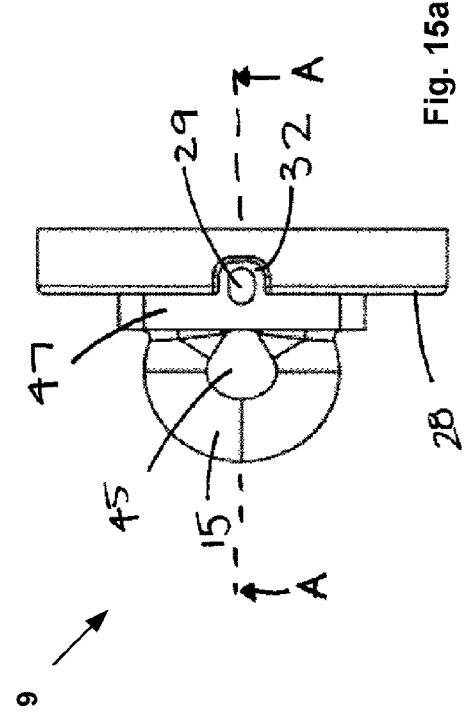
FIG. 15a is a side view of an embodiment of a second component.
Figure 15G:
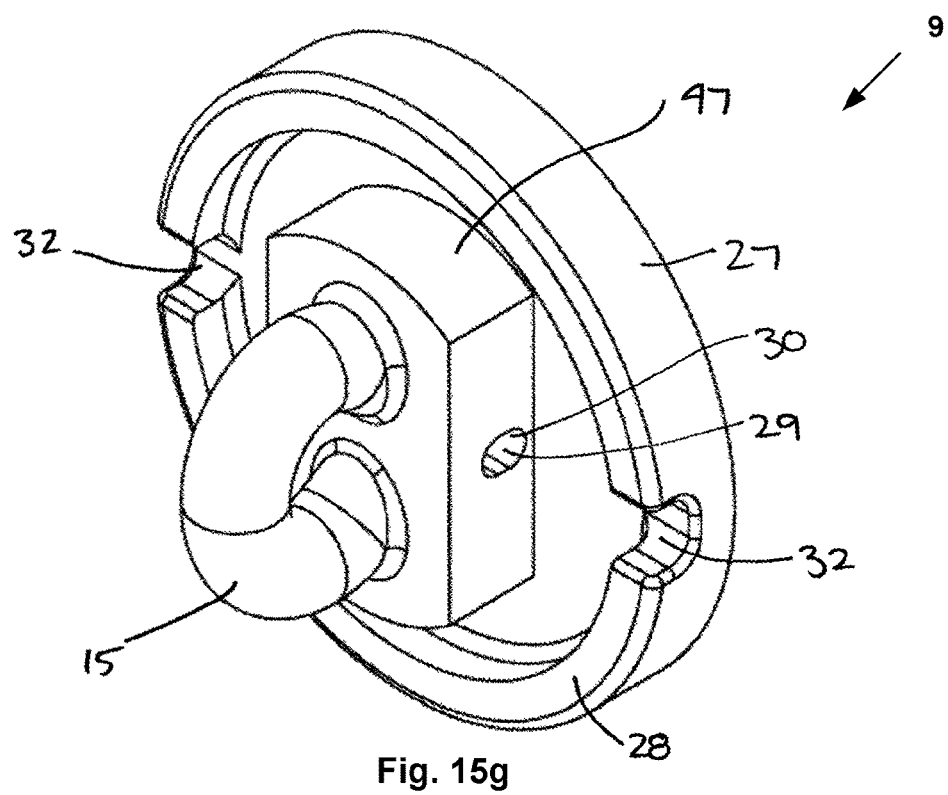
Figure 15H:
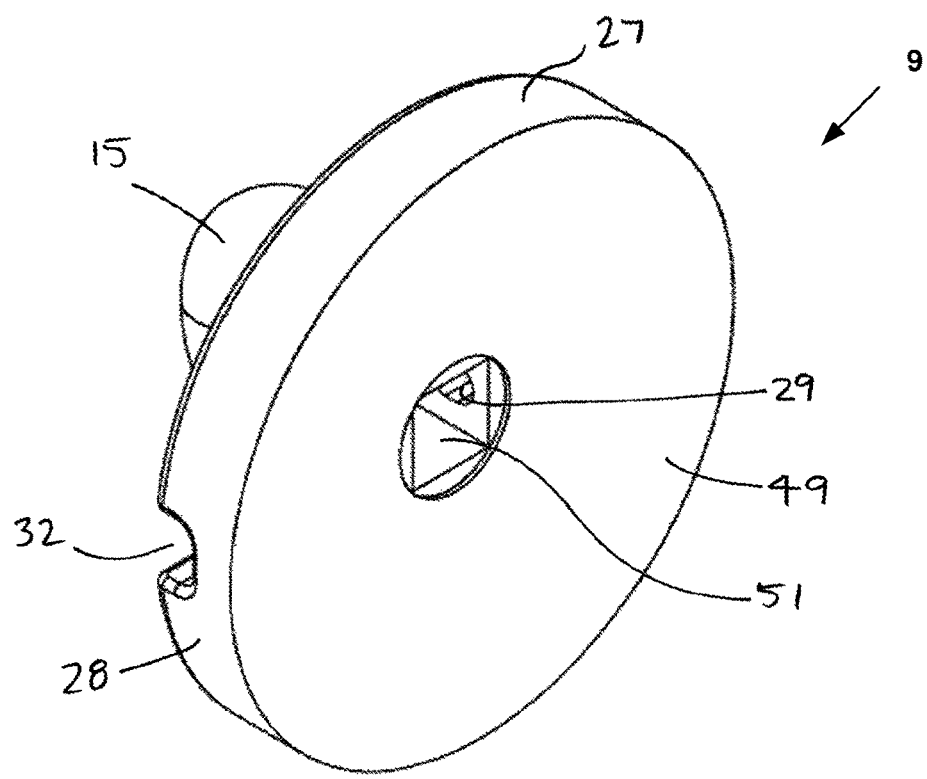
Figure 16B:
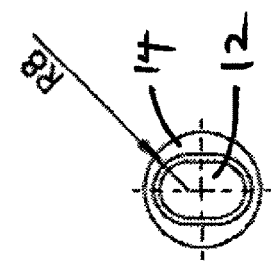
Figure 16C:
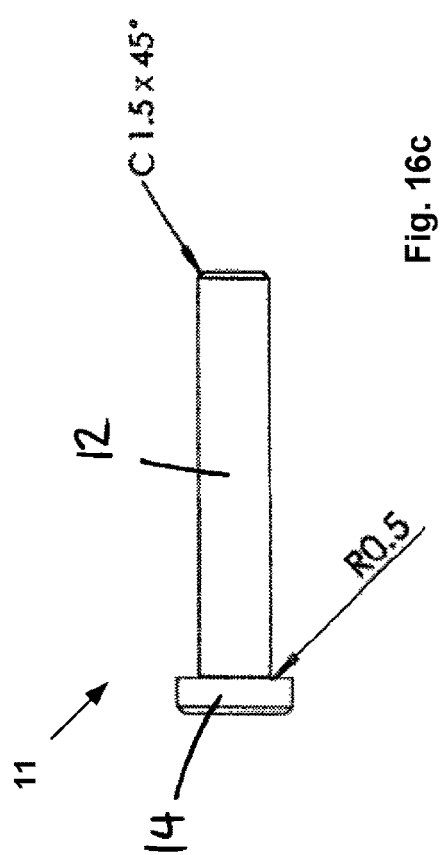
Figure 16A:
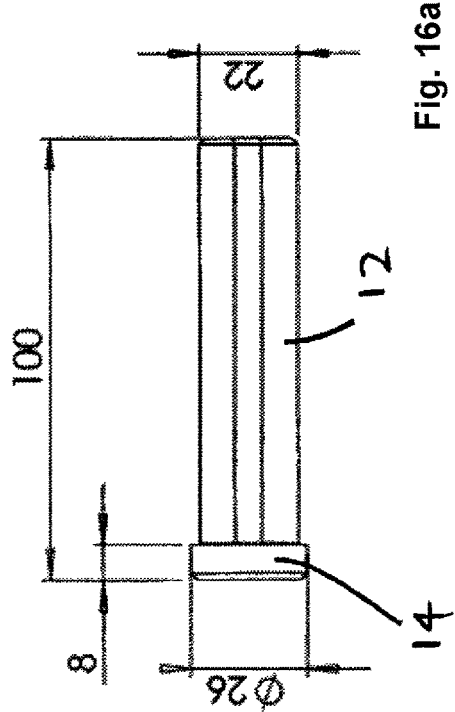
FIG. 16a is a side view of an embodiment of a fastener.
Figure 16D:
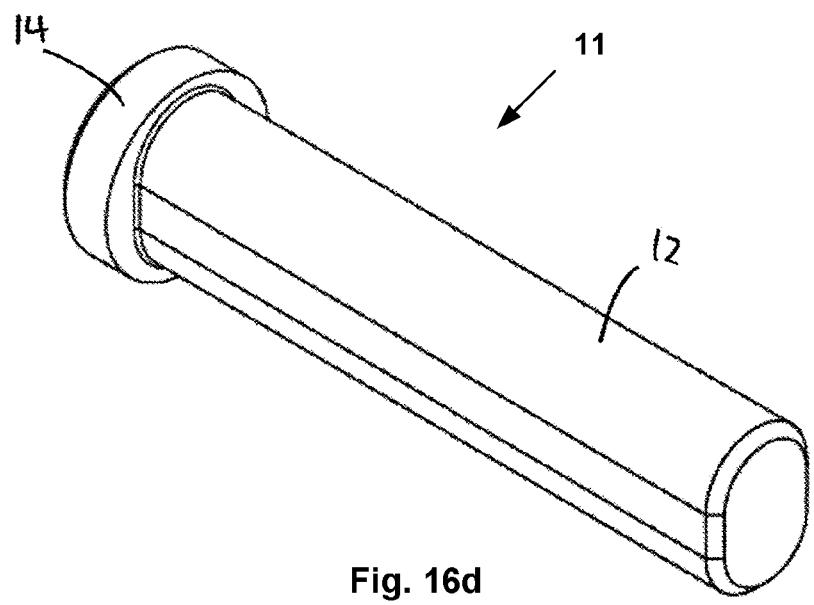
Figure 16E:
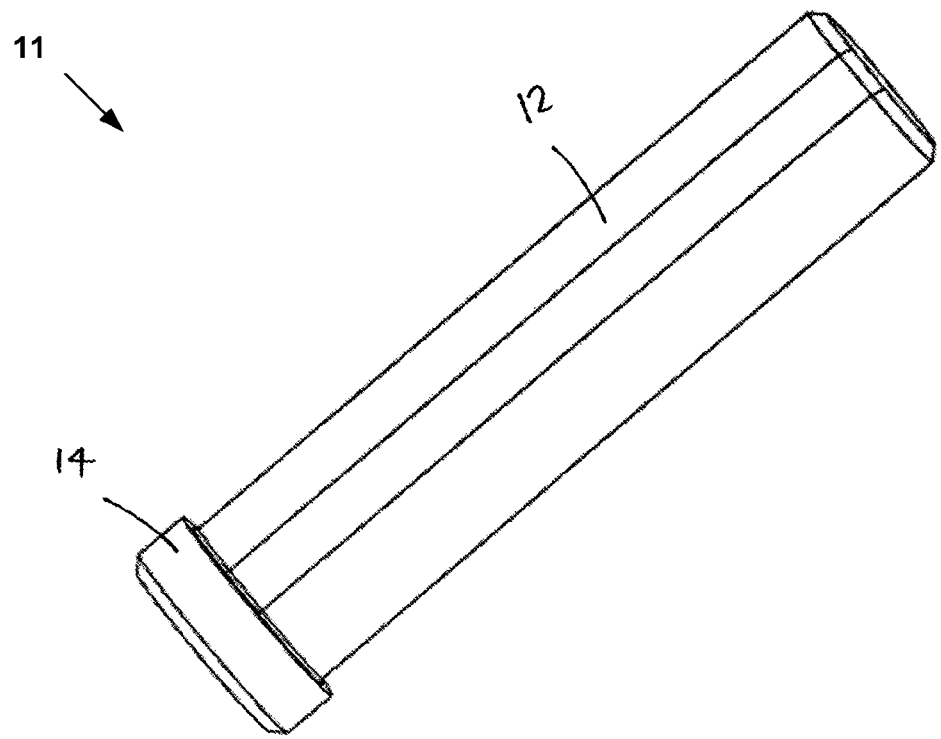
Figure 17:
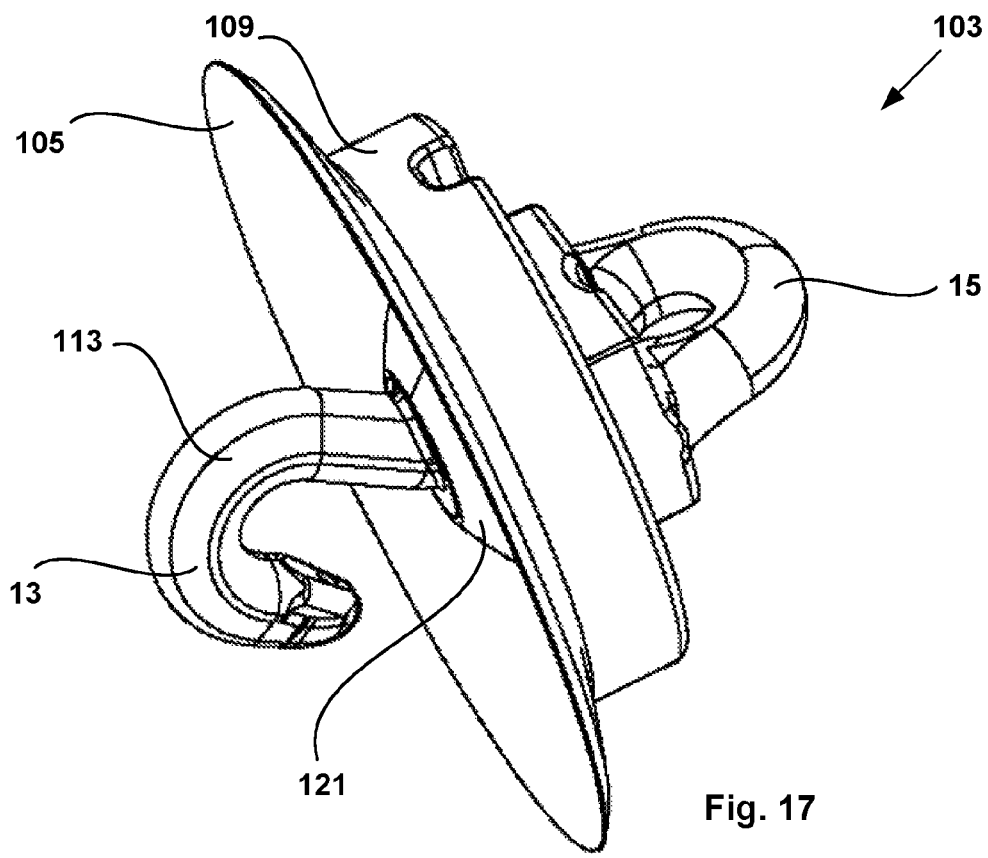
FIG. 17 is a front perspective view of a link assembly of an agricultural ground engaging chain according to another embodiment.
Figure 18:
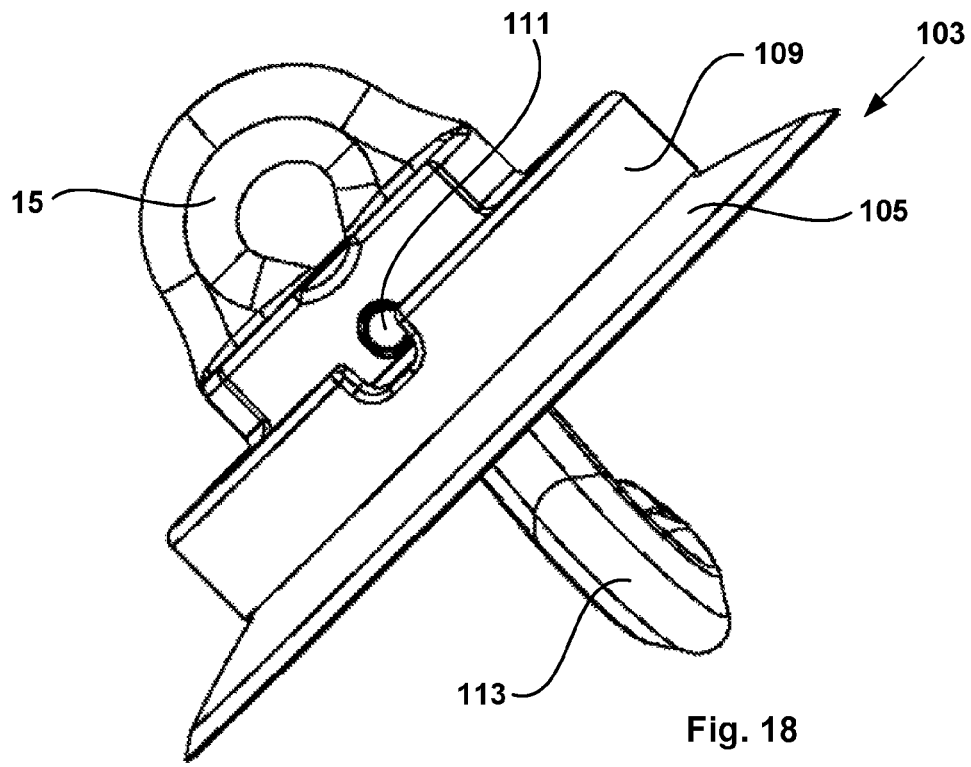
FIG. 18 is an alternative view of the link assembly of FIG. 17.
Figure 19A:
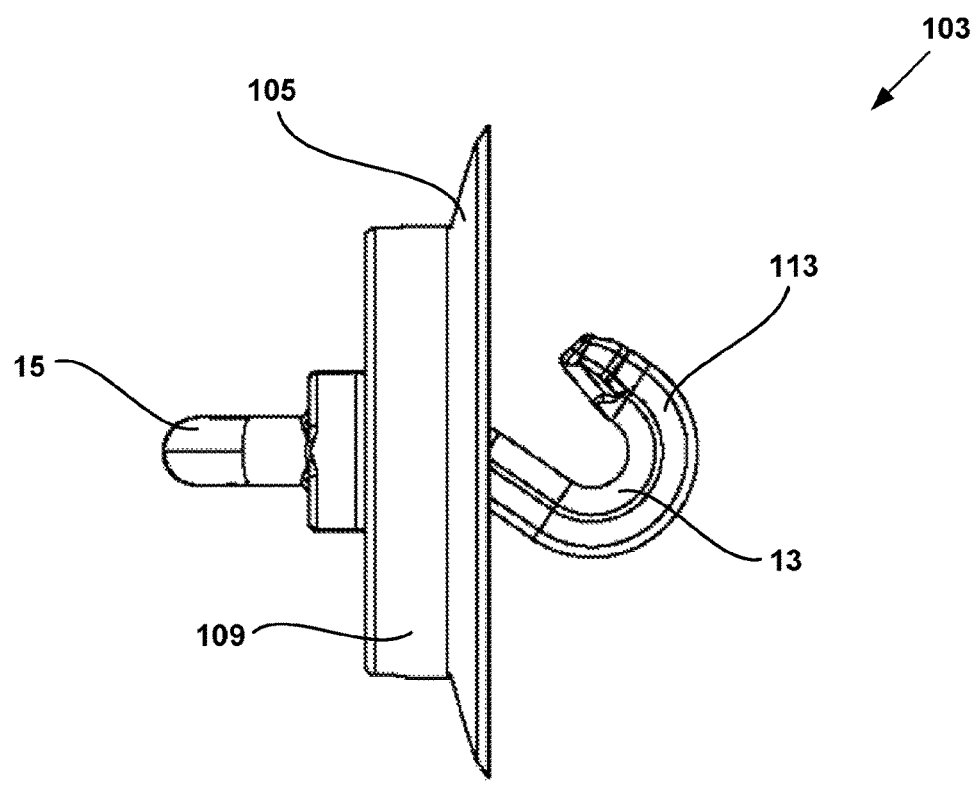
FIG. 19a is a top view of the link assembly of FIG. 17.
Figure 19B:
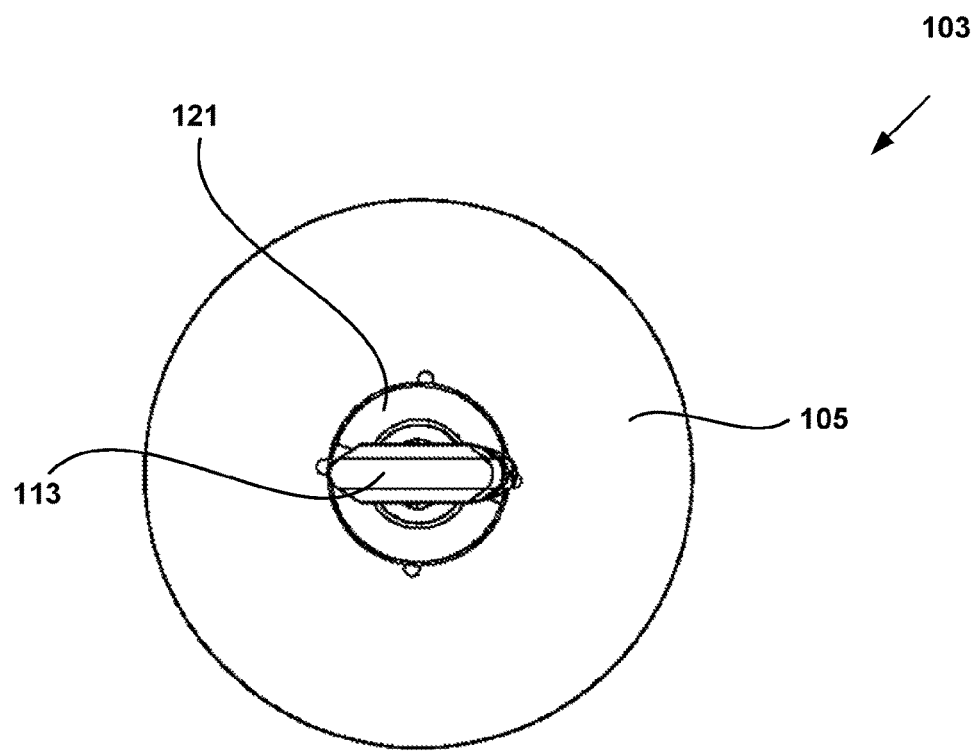
FIG. 19b is a front view of the link assembly of FIG. 17.
Figure 20A:
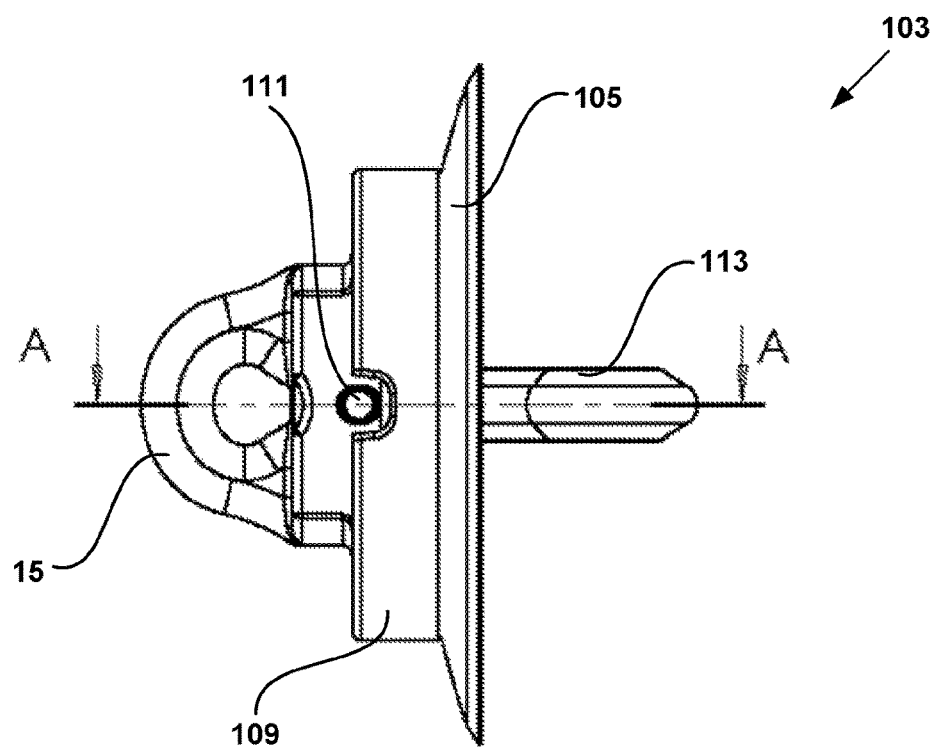
FIG. 20a is a side view of the link assembly of FIG. 17.
Figure 20B:
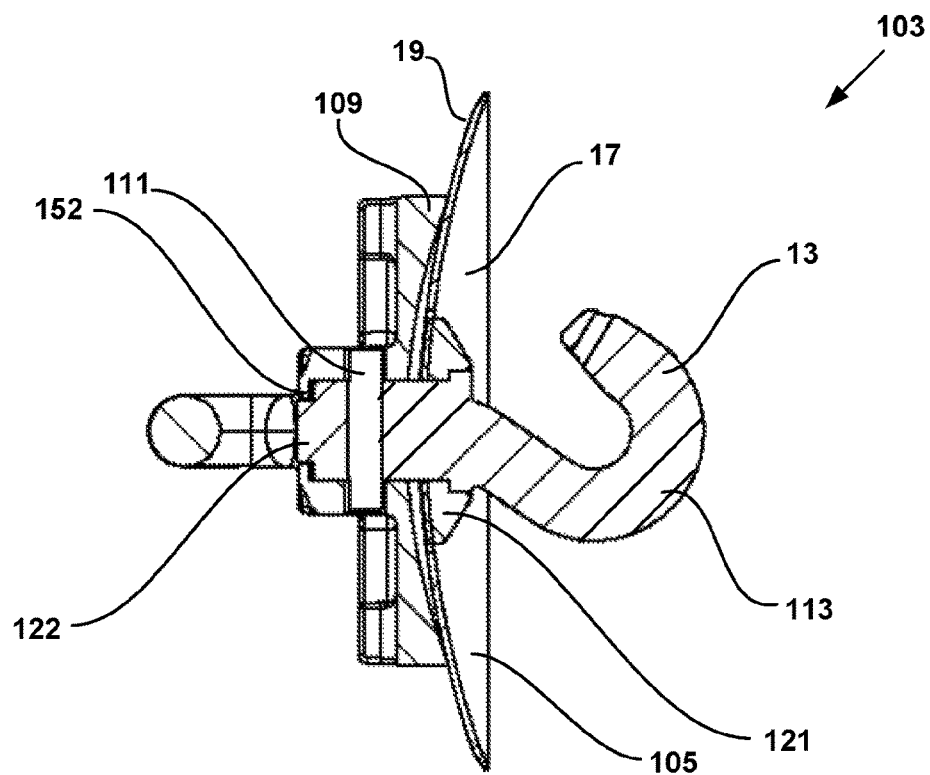
Figure 23F:
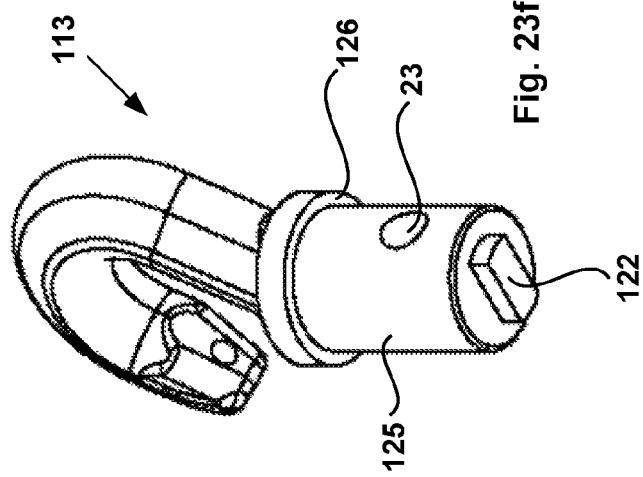
Figure 23E:
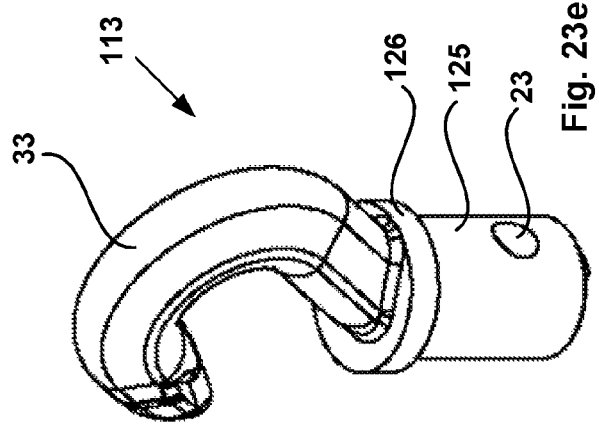
Figure 23D:
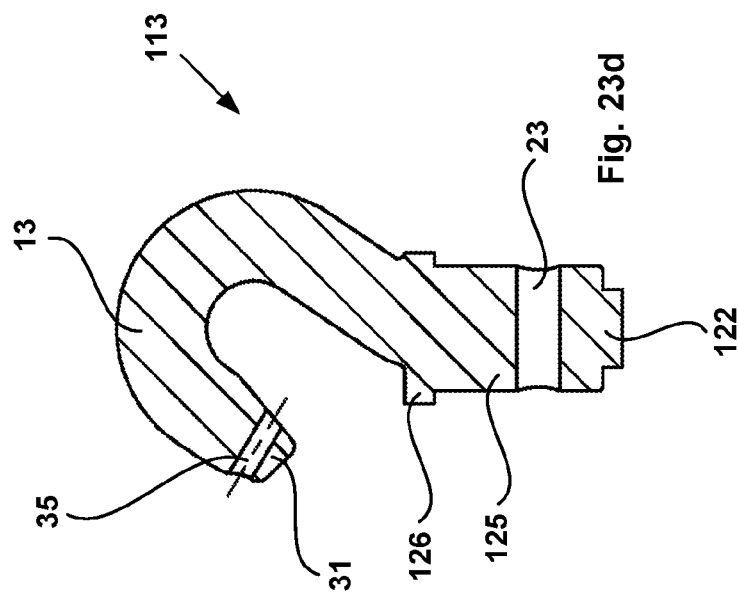
FIG. 23d is a cross-section top view of the hook subcomponent of FIG. 23c along section line A-A.
Figure 25B:
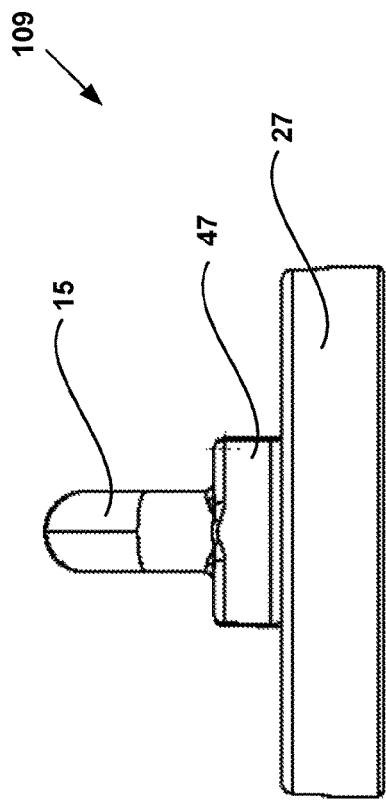
Figure 25A:
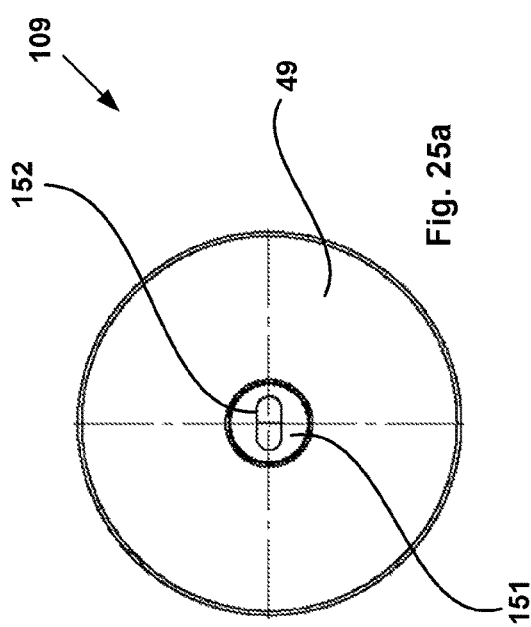
Figure 25C:
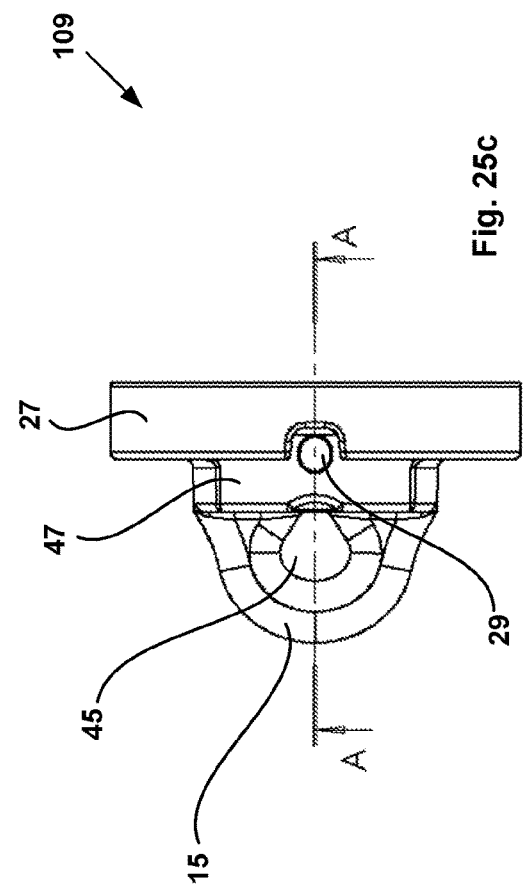

Extending from the second clamping portion 27, on the opposite side to the concave surface 49 is an annular flange 28, as best illustrated in FIGS. 15*g* and 15*h*. The annular flange 28 extends at the outer periphery of the second clamping portion 27. A clearance cut 32 is provided in the annular flange 28 to provide a clear path for the fastener 11 to be inserted into the fastener receiving passages 23, 29. The clearance cut 32 may also provide a clear path for tools, such as a punch, to access the fastener 11.

In one embodiment, the concave surface 49 has a radius of curvature ($R_2$) of approximately 796 mm, and the clamping portion 21 has a diameter of approximately 250 mm.

Fastener

Referring to FIGS. 16*a* to 16*e*, the fastener 11 can be a shear pin and includes a shaft portion 12, and a head 14. In one embodiment, the shaft portion 12 extends in a substantially straight shaft axis and is substantially smooth to aid insertion through the first and second fastener receiving passages 23, 25. The head 14 may be larger than the cross-section of the shaft portion 12 to limit insertion of the fastener 11 through the fastener receiving passages 23, 25. The shaft 12 of the fastener 11 has a cross sectional shape of a stadium (that is two parallel sides joined by semi-circular ends), similar to the shape of the fastener receiving passages 23, 29. In one embodiment, the parallel sides of the stadium are 3 mm in length, and the radius of the semi-circular ends is 8 mm.

In one embodiment, the fastener has an overall length of approximately 100 mm with a shaft 12 length of approximately 92 mm.

Assembly and Disassembly of the Link Assembly

The assembly and disassembly of a link assembly 3 will now be described with reference to FIGS. 10a to 10e.

Assembly

It will be appreciated that different methods of assembling the link assembly 3 may be performed, and in some cases, the order of the step may be rearranged. The following is a description of one method of assembling the link assembly 3.

Figure 10E:
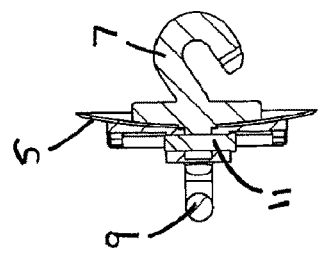
FIGS. 10a to 10e are side views showing a sequence of assembling a link of the agricultural ground engaging chain.
Figure 10D:
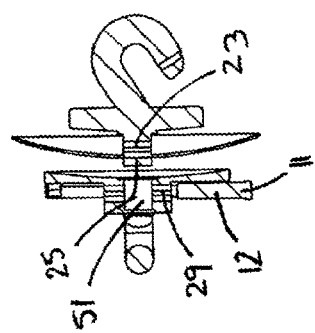
Figure 10C:
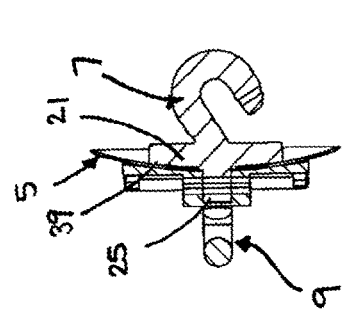
Figure 10B:
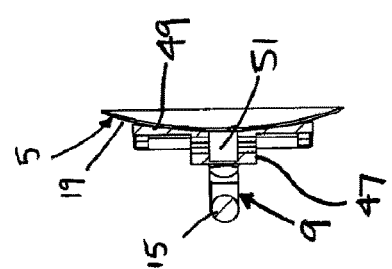
Figure 10A:
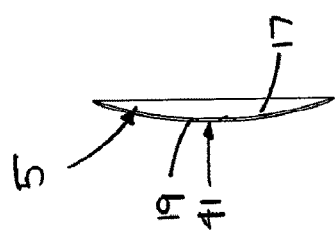

Referring to FIG. 10a, a harrow member 5 is provided. A second component 9 is then positioned so that the second clamping portion 27 is close to, or in abutment with, the second side 19 and with the socket 51 aligned with the central aperture 41, as shown in FIG. 10b.

The projecting portion 25 of the first component 7 is then inserted through the central aperture 41 of the harrow member 5, and into the socket 51. In one embodiment, the projecting portion 25 and the socket 51 is complementarily shaped, such as having a square profile, to aid in inserting and aligning the first and second fastener receiving passages 23, 29. In alternative embodiments, it may be necessary for the user to rotate the first component 7 relative to the second component 9 around the axis of the projecting portion 25 to align the fastener receiving passages 23, 29.

As the projecting portion 25 is inserted into the socket 51, the first component 7 is moved towards the harrow member 5 until the first clamping portion 21 is close to, or in abutment with, the first side 17 of the harrow member as shown in FIG. 10c. In this configuration, the first clamping portion 21 is in contact with the first side 17, and the second clamping portion 27 is in contact with the second side 19, but the harrow member 5 is not under force/pressure and is in a natural relaxed state. In this relaxed state, the first fastener receiving passage 23 and second fastener receiving passage 29 will be slightly out of coaxial alignment, so that the straight shaft portion 12 of the fastener will not be able to be freely inserted through both the first and second fastener receiving passage 23, 29.

Referring now to FIG. 10d, the first and second components 7, 9 are pushed towards one another typically under mechanical pressure so that the respective clamping portions 21, 27 press against, and elastically deform the harrow member 5. This deformation of the harrow member 5 allows the first and second components 2, 9 to additionally move closer towards one another, so that the first and second fastener receiving passages 23, 29 co-axially align. This allows the shaft 12 of the fastener 11 to pass through both the first and second fastener receiving passage 23, 29, as shown from FIGS. 10d to 10e.

In one embodiment, this involves using a hydraulic or pneumatic jack or ram to provide an external force to move the first and second components 7, 9 relative to each other. For example, the second component 9 may be held in a stationary cradle, and a ram may be used to move the first component 7 towards the second component 9 in direction B. Alternatively, the first component 7 may be held in a stationary cradle, and a ram may be used to move the second component 9 towards the first component 7 in direction A. In yet another alternative, external clamp may move both the first component 7 and second component 9 towards each other in directions A and B respectively.

Once the shaft 12 of the fastener 11 is located in position, as shown in FIG. 10e, the external force on the first and second components 7, 9 can be removed. This generally completes assembly of the link assembly 3.

Once assembled, the elastically deformed harrow member 5, under elastic stress, bears against the surfaces of the clamping portions 21, 27. As a result, the first side 17 of the harrow member 5 will urge against the convex surface 39 of the first clamping portion 21 generally in direction A. The second side 19 of the harrow member 5 will urge against the concave surface 49 of the second clamping portion 27 in direction B. That is the first and second components 3, 9 will be urged away from one another. Referring to FIG. 8b, this results in the wall portion 24 of the first fastener receiving passage 23 to be urged in direction A against the shaft 12 of the fastener 11. In addition, this also results in the wall portion 30 of the second fastener receiving passage 29 to be urged in direction B against the shaft 12 of the fastener 11. The resultant force, which includes a component that is in a direction normal to part of the contacting surfaces, results in an increase in the maximum static friction force between the wall portions of the first and second fastener receiving passages 23, 29 and the shaft. This increase in maximum static friction force assists in retaining the fastener 11 in place. The two wall portions 24, 30 effectively clamp the fastener 11 in position such that it cannot be readily withdrawn.

Disassembly

Like the method of assembling of the link assembly, different ways of disassembling the link assembly 3 may be performed. An embodiment of a method will now be described.

When disassembling a link assembly 3, it is preferable to first separate the link assembly 3 from the chain 1, the method of which was described above. Referring to FIG. 10e, a single link assembly 3 to be disassembled is provided. To assist removal of the fastener 11, it is preferable to minimise friction between the shaft 12 of the fastener 11 and the wall portions of the first and second fastener receiving passages 23, 29. To achieve this, the normal forces/pressure against the surfaces of the shaft 12 and the fastener receiving passages 23, 29 is reduced by applying an external force/pressure to the first and second components 7, 9 to counteract the bias by the elastically deformed harrow member 5.

This can be achieved in a similar way to applying the force/pressure to the first and second components 7, 9 during assembly. For example, the second component 9 may be placed in a stationary cradle, and a ram may be used to apply a force in direction B to balance the force from the elastically stressed harrow member 5. Once this force is applied, the friction force on the shaft 12 will be reduced, and the fastener may be driven out by a punch or other appropriate tool. In other alternatives, the force may be applied by a ram on the second component 9, or on both the first and second components 7, 9.

In yet another alternative, the fastener 11 may be driven out without applying force/pressure on the first and/or second components 7, 9 to reduce the friction. In one alternative, a punch, preferably a mechanically assisted punch, may drive out the shaft 12 by applying enough force to overcome the maximum static friction force. In one embodiment, the fastener 11, after removal may be reused to subsequently assemble a link assembly 3. In yet another alternative method of disassembly, the fastener 11 may be destructively removed, such as by drilling.

Once the fastener 11 is removed, the other components may be separated from one another unimpeded, by withdrawing the projecting portion 25 from the socket 51.

Deformation of the Harrow Member in Relation to Clamping Portions

The mechanism of deformation of the harrow member 5 and the interaction with the clamping portions 21, 27 will now be described in further detail with reference to FIGS. 11*a* to 11*d* that show four variations. These drawings show simplified parts of the harrow member 5 and the clamping portions 21, 27, and not all parts are shown for simplicity. Furthermore these drawings are not to scale, and some dimension may be exaggerated to aid clear understanding of the described concepts.

In some embodiments, the resilient harrow member 5 is elastically deformed by bending. In some particular embodiments, the harrow member 5 is disc and/or dish shaped, which is more or less in the form of a plate. As such, elastic deformation of the harrow member 5 may be modelled as bending of a plate. In embodiments illustrated in FIGS. 11*a* to 11*d*, this elastic deformation is caused by application of force against the first side 17 of the harrow member 5 by the first clamping portion 21 in direction B, and application of an opposing force against the second side 19 of the harrow member 5 by the second clamping portion 27 in direction A. The structural shape and configuration of these components causes the harrow member 5 to elastically deform (i.e. bend). The resultant elastic stress in the harrow member 5 provides opposing forces against the first and second clamping portions 21, 27.

Particular embodiments will now be described in detail.

Radius of Curvature of Clamping Portions Greater than Radius of Curvature of Harrow Member Referring to FIG. 11*a*, this drawing shows an embodiment where, during assembly, the harrow member 5 starts from a dish-shape (when relaxed), to be deformed to a shallower dish-shape. That is, where the general curvature of the harrow member 5 is reduced.

The first clamping portion 21 has a convex surface 39 with a radius of curvature $R_1$. The second clamping portion 27 has a concave surface 49 with a radius of curvature $R_2$. The harrow member 5 has a radius of curvature $r_1$ on the first side 17, and a radius of curvature $r_2$ on the opposing second side 19 when the harrow member 5 is at rest (i.e. when not affected by external forces). Thus the first and second sides 17, 19 have generally similar or matching shapes (but not necessarily the same dimensions or exact curvature) to the corresponding surfaces of the clamping portions 21, 23.

In this embodiment, the radius of curvature $R_1$ is greater than the radius of curvature $r_1$ when the harrow member 5 is at rest. Therefore when the first clamping portion 21 is moved in direction B towards the first side 17, the convex surface 39 initially abuts the first side 17 annularly at a location distal from the centre of the harrow member 5. As further force is applied in direction B against the first side 17, the harrow member 5 is deformed so that the radius of curvature of the first side 17 will deform to be closer to that of the radius of curvature $R_1$. In some embodiments, when the link assembly 3 is assembled, the deformed harrow member 5 will have a radius of curvature of the first side 17 that is substantially equal to that of the radius of curvature $R_1$ of convex surface 39.

The radius of curvature $R_2$ is greater than the radius of curvature $r_1$ when the harrow member 5 is at rest. Therefore, when the second clamping portion 27 is moved in direction A towards the second side 19, the concave surface 49 initially abuts the second side 19 at a location proximal to the centre of the harrow member 5. As further force is applied in direction A against the second side 19, the harrow member 5 is deformed so that the radius of curvature of the second side 19 will deform to be closer to that of the radius of curvature $R_2$. In some embodiments, when the link assembly 3 is assembled, the deformed harrow member 5 will have a radius of curvature of the second side 19 that is substantially equal to that of the radius of curvature $R_2$ of the concave surface 49.

In some embodiments an appropriate radius of curvature when clamped i.e. the radius of curvature $R_2$ is 796 mm, deforming the harrow member 5 from an original radius of curvature $r_2$ of 544 mm. This will result in approximately 3 mm of compression of the harrow member 5 under load.

Radius of Curvature of Clamping Portions Less than Radius of Curvature of Harrow Member Referring to FIG. 11*b*, this drawing shows an embodiment where, during assembly, the harrow member 5 starts from a dish-shape (when relaxed), to be deformed to a have a deeper dish-shape. That is, where the general curvature of the harrow member 5 is increased.

Like the above mentioned embodiment, the first clamping portion 21 has a convex surface 39 with a radius of curvature $R'_1$ and the second clamping portion 27 has a concave surface 49 with a radius of curvature $R'_2$. The harrow member 5 has a radius of curvature $r'_1$ on the first side 17, and a radius of curvature $r'_2$ on the opposing second side 19 when at rest.

In this embodiment, the radius of curvature $R'_1$ is less than the radius of curvature $r_1$ when the harrow member 5 is at rest. Therefore when the first clamping portion 21 is moved in direction B towards the first side 17, the convex surface 39 initially abuts the first side 17 at a location proximal to the centre of the harrow member 5. As further force is applied in direction B against the first surface 17, the harrow member 5 is deformed so that the radius of curvature of the first side 17 will deform to be closer to that of the radius of curvature $R'_1$.

The radius of curvature $R'_2$ is less than the radius of curvature $r'_1$ when the harrow member 5 is at rest. Therefore, when the second clamping portion 27 is moved in direction A towards the second side 19, the concave surface 49 initially abuts the second side 19 annularly at a location distal to the centre of the harrow member 5. As further force is applied in direction A against the second side 19, the harrow member 5 is deformed so that the radius of curvature of the second side 19 will deform to be closer to that of the radius of curvature $R'_2$.

In some embodiments, when the link assembly 3 is assembled, the deformed harrow member 5 will have a radius of curvature of the first side 17 that is substantially equal to that of the radius of curvature $R'_1$ of convex surface 39, and the radius of curvature of the second side 19 that is substantially equal to that of the radius of curvature $R'_2$ of the concave surface 49.

In some embodiments an appropriate radius of curvature of $R'_1$ and $R'_2$ may be around 500 mm for a disc harrow having a radius of curvature $r'_2$ of 544 mm at rest.

Harrow Member without Matching Curvature with Clamping Portions when at Rest

Figure 11C:
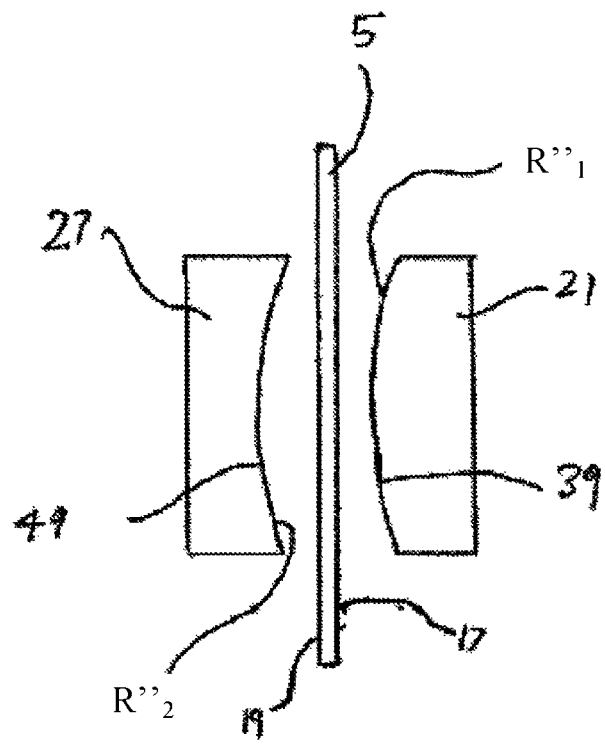
FIG. 11c is a cross-section side view (not to scale) of another embodiment where the harrow member does not have a matching curvature with the curvature of the harrow members.

Referring to FIG. 11c, this drawing shows an embodiment where the harrow member 5 has a disc-shape (when relaxed) that does not closely match the curvature of the convex and concave surfaces of the clamping portions 21, 27. In this illustrated embodiment, the first and second sides 17, 19 are relatively flat and parallel to each other. However, it is to be appreciated that in some embodiments, the first and second sides 17, 19 may have some curvature.

In this embodiment, during assembly, the harrow member 5 starts from a disc-shape (when relaxed), to be deformed to a dish-shape. That is, the flat plate-like shape of the harrow member 5 is bent to have a curvature of a dish.

Like the above mentioned embodiments, the first clamping portion 21 has a convex surface 39 with a radius of curvature $R''_1$ and the second clamping portion 27 has a concave surface 49 with a radius of curvature $R''_2$. However in this embodiment, the harrow member 5 has substantially parallel first and second sides 17, 19 when at rest.

When the first clamping portion 21 is moved in direction B towards the first side 17, the convex surface 39 initially abuts the first side 17 at a location proximal to the centre of the harrow member 5. As further force is applied in direction B against the first surface 17, the harrow member 5 is deformed so that the first side 17 will deform towards the radius of curvature $R''_1$ of the first clamping portion 21.

When the second clamping portion 27 is moved in direction A towards the second side 19, the concave surface 49 initially abuts the second side 19 annularly at a location distal to the centre of the harrow member 5. As further force is applied in direction A against the second surface 19, the harrow member 5 is deformed so that the second side 19 will deform towards the radius of curvature $R''_2$ of the second clamping portion 27.

In some embodiments, when the link assembly 3 is assembled, the deformed harrow member 5 will have a radius of curvature of the first side 17 that is substantially equal to that of the radius of curvature $R''_1$ of convex surface 39, and the radius of curvature of the second side 19 that is substantially equal to that of the radius of curvature $R''_2$ of the concave surface 49.

Clamping Portions Having a Structure to Cause Bending of the Harrow Member

Figure 11D:
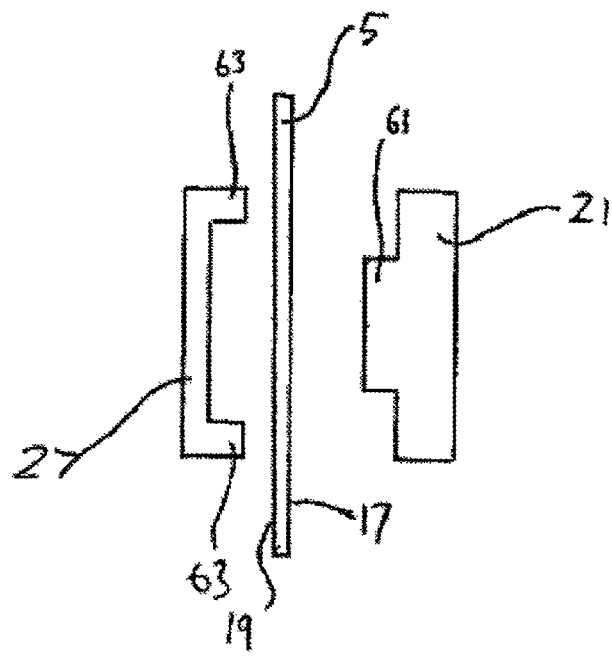
FIG. 11d is a cross-section side view (not to scale) of another embodiment where the clamping portions and harrow member do not have concave or convex surfaces.

Referring to FIG. 11d, this drawing shows an embodiment where the clamp portions 17, 19 have a structural configuration to cause bending of the harrow member 5, without necessarily having respective concave and convex surfaces.

The first clamping portion 21 has a central boss 61 provided to face and abut with the central region of the first side 17. The second clamping portion 27 includes an annular flange 63 provided to face and abut with a portion of the second side 19 distal from the central region of the second side 19. In this embodiment, the central boss 61 is round and has an outer radius from the centre, that is less than the inner radius of the annular flange 63. However, it is to be appreciated that other shapes, and structures may also be suitable.

When the first clamping portion 21 is moved in direction B towards the first side 17, the boss 61 abuts the first side 17 at a location proximal to the centre of the harrow member 5. When the second clamping portion 27 is moved in direction A towards the second side 19, the flange 63 abuts the second side 19 annularly at a location distal to the centre of the harrow member 5. When further force is applied to both the first and second clamping portions 21, 27 this causes the harrow member 5 to elastically deform (i.e. bend) to a dish shape, with the outer periphery of the harrow member 5 displaced relatively in direction A, and the central portion of the harrow member 5 displaced relatively in direction B. This deformation of the resilient harrow member 5 results in elastic stress that provides opposing forces against the first and second clamping portions 21, 27 as described above. This force in turn increases the maximum static friction force between the shaft and the first and second fastener receiving passages 23, 29.

In this illustrated embodiment, the first and second sides 17, 19 are relatively flat and parallel to each other. However, it is to be appreciated that in some embodiments, the first and second sides 17, 19 may be curved. As an example, this may include the shape and profile of the curved harrow member 5 described in the first embodiment above.

Advantages

Advantages of the present disclosure have been discussed above. In one embodiment, the present disclosure allows a user to disassemble a link assembly 3, so that individual components can be serviced, repaired or replaced. For example, if a harrow member 5 is damaged, the damaged harrow member 5 can be replaced without replacing the other components. This can save cost.

The present disclosure also allows different size, shape or type of harrow member 5 to be assembled with other common parts of the link assembly 3. This increases flexibility in the chain 1 system and may have logistical and cost savings.

The present disclosure may also allow different components of the link assembly 3 to be manufactured with different processes most suitable and cost effective for the technical requirements for that component, instead of compromising manufacturing techniques and materials suitable for all components in an integrally formed link. For example, the harrow member 5 may be formed of pressed steel instead of being cast. In one form, pressed steel may have better qualities than casting, such as providing a higher strength for a given thickness. Thus in one form, the harrow members 5 may be manufactured to have thinner cross-sectional profile for a given strength rating.

Alternative Embodiment of a Link Assembly of an Agricultural Ground Engaging Chain An alternative embodiment of a link assembly 103 for an agricultural ground engaging chain 1 will now be described with reference to FIGS. 17 to 26. Features of this alternative embodiment that are the same or similar to features described in the embodiments above have the same reference numbers.

The link assembly 103, like the earlier described link assembly 3, can be hooked together to form an agricultural ground engaging chain 1 and used across ground in the same or similar manner as described above. Furthermore the link assemblies 103 may be assembled and disassembled in a similar manner to the link assemblies 3 described above with the exception of the differences discussed below.

Referring to FIG. 21, which shows an exploded view of the link assembly 103, one noticeable feature is that the first component 107 includes a hook subcomponent 113 and a clamping subcomponent 121. Other components of the link assembly 103 include the resilient harrow member 105, a second component 109, and a fastener 111.

Resilient Harrow Member

Referring to FIGS. 22a and 22b, the resilient harrow member 105 is substantially dish-shaped with the first side 17 having a concave surface and a second side 19 having a convex surface. The radius of curvature of the concave or convex surface may be different to the convex surface 39 and concave surface 49 of the first component 107 and second component 109 as described above.

The resilient harrow member 105 also has a central aperture 41 with relief cuts 43 extending therefrom as described in the embodiments of the resilient harrow member 105 described above. In addition, the resilient harrow member includes relief apertures 144 provide at the radially distal end of the relief cuts 43. The relief apertures 144, which are substantially circular or elliptical, may advantageously reduce the chance of formation or propagation of a crack at the end of the relief cuts 43. This is due to the relief apertures 144 providing a curved edge to reduce concentration of stress that may form at a sharp or abrupt end of the relief cuts 43.

First Component Including Hook Subcomponent and Clamping Subcomponent

As noted above, the first component 107 in this embodiment is formed of two subcomponents 113, 121. When assembled, the subcomponents 113, 121 forming the first component 107 functions in the same, or similar, way as the first component 7 described above.

Referring to FIGS. 23a to 23f, the hook subcomponent 113 includes a hook 13 that includes a narrow point 31 and an arcuate bend 33 to provide a first link portion. A bore 35 is provided to receive a retaining pin 37 to prevent separation of the hook 13 with a joined loop 15 of the second component 109.

A projecting portion 125 having a generally cylindrical shape extends from the hook 13 of the hook subcomponent 113. At a distal end of the projecting portion 125, a projection 122 for alignment is provided. The projection 122 is received in a complementary shaped receptacle 152 of the second component 109 for relative alignment of the hook subcomponent 113 with the second component 109. The shape of the projection 122 and the complementary shaped receptacles 152 in this embodiment has a stadium-shaped cross-section. However, it is to be appreciated different complementary shapes may be used, for example a cuboid shape, a pyramid shape, star shaped cross-section, etc.

At an intermediate portion of the hook subcomponent 113 is a collar 126. When assembled, the collar 126 abuts a corresponding bearing surface 140 on the clamping subcomponent 121 to maintain clamping force of the clamping subcomponent 121 against the resilient harrow member 105.

A first fastener receiving passage 23 extends through the projecting portion 125 to receive the fastener 111. The first fastener receiving passage 23 has a cross-section substantially circular or alternatively the shape of a stadium, ellipse, etc.

Referring to FIGS. 24a to 24d, the clamping subcomponent 121 includes a convex surface 39 that, when the link assembly 103 is assembled, provides a surface that abuts the concave surface of the first side 17 of the harrow member 105 to provide the first clamping portion. The clamping subcomponent 121 includes a central aperture 142 to allow the cylindrical projection portion 125 of the hook subcomponent 113 to pass through.

The bearing surface 140, which is provided on a shelf in the central aperture 142, allows a transfer of force from the collar 125 of the hook subcomponent 113 to the clamping subcomponent 121, which in turn transfers force from the convex surface 39 to the first side of the harrow member 105. This arrangement allows the first component 107 to function similarly to the first component 7 described above. However, forming the first component 107 from subcomponents 113, 121 may be easier or cheaper to manufacture compared to forming the first component 7 as a single unitary piece.

Second Component

Referring to FIGS. 25a to 25f, the second component 109 includes a loop 15 with a ring aperture 45 to form a second link portion for joining with a hook 13 of another link assembly 103. The central region of the second component 109 includes a body portion 47. Opposite to the loop 15 is a second clamping portion 27 that has a concave surface 49. When assembled, the concave surface 49 abuts the corresponding convex surface of the second side 19 of the resilient harrow member 105.

Extending into the second component 109 from the concave surface 49 is a socket 151 with a circular cross-section to receive the cylindrical projecting portion 125 of the first component 107. At one end of the socket 151 is an alignment receptacle 152 that, as described above, is shaped complementary to the projection 122 to assist relative alignment between the hook subcomponent 113 and the second component 109. In particular, the complementary shape assists angular alignment around the common axis of the cylindrical projecting portion 125 and socket 151.

A pair of second fastener receiving passages 29 is provided in body portion 47 to receive the fastener 111. In this embodiment, the second fastener receiving passages 29 have a cross-section shape of a stadium. The stadium cross-section may assist assembly, and disassembly, by allowing some tolerance in alignment of the first and second fastener receiving passages 23, 29 during assembly and disassembly. However it is to be appreciated that other embodiments the second fastener receiving passages 29 may have a circular shape, elliptical shape, etc.

Fastener

Figure 26:
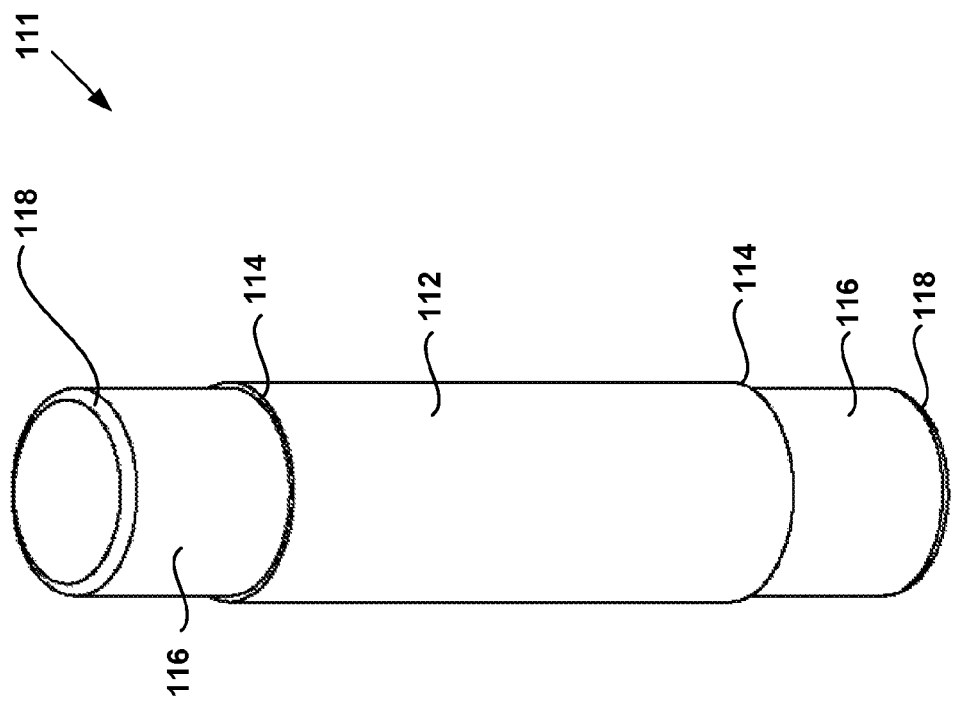
FIG. 26 is a perspective view of a fastener of the link assembly of FIG. 17.
Figure 25F:
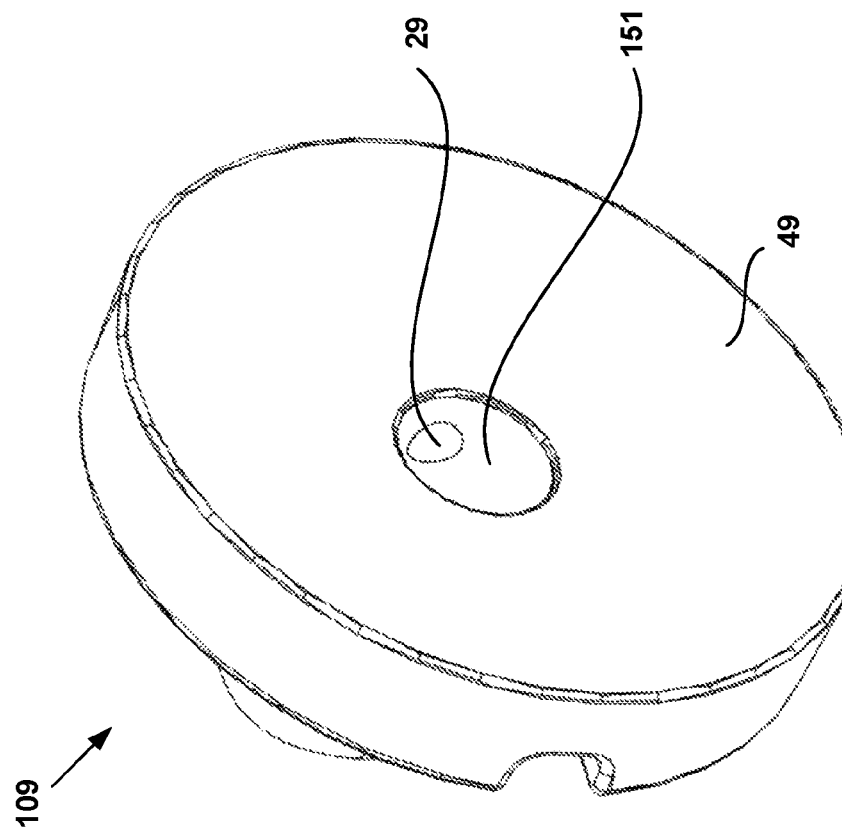

Referring to FIG. 26, the fastener 111 is in the form of a pin having a shaft with a substantially circular cross-section. The fastener 111 has a central shaft portion 112 with a relatively larger diameter than opposite shaft end portions 116 that have a smaller diameter. When assembled, the central shaft portion 112 is substantially located in the first fastener receiving passage 23 and the opposite end portions 116 are substantially located in the second fastener receiving passages 29.

As described above, static friction force between wall portions of the first and second passages 23, 29 and the fastener 111 can assist retaining the fastener 111 in place. In addition, the step 114 between the larger diameter of the central shaft portion 112 and the smaller diameter end portions 116 may also assist retention of the fastener 111. When assembled, the resilient harrow member 105 urges against the first and second components 107, 109 away from one another, which in turn urge the first and second passages 23, 29 away from being co-axial with one another. This causes the first and second passages 23, 29 to have slightly offset axes so that the steps 114 are caught by the offset wall portions of the second passages 29. This stops or impedes the fastener 111 from moving out of the passages 23, 29. During disassembly, force/pressure may be applied to the first and second components 107, 109 to align the first and second passages 23, 29 towards having a common axis so that the steps 114 are not caught by the wall portion of the second passages 29 thereby facilitating removal of the fastener 111.

The end portions 116 may also include a bevelled edge 118 to assist insertion of the fastener 111 into the passages 23, 29.

Other Variations

In the above described embodiment, the chain 1 has been described to include link assemblies 3 each having a hook 13 and a loop 15. However, it is to be appreciated in an alternative embodiment, the chain 1 may be formed with two types of link assemblies. A first type of link assembly (loop and loop link assembly) can include a first link portion and second link portion in the form of loops. A second type of link assembly (hook and hook link assembly) can include a first link portion and a second link portion in the form of hooks. Thus the chain 1 may be formed by joining, in an alternating fashion, link assemblies of the first and second types. That is, a loop and loop link assembly, joined to a hook and hook link assembly, which in turn is joined to another loop and loop link assembly, etc.

It is also to be appreciated that the concave and convex surfaces, as described in the above embodiments, is not limiting, and other arrangements and variations to may be used. In other embodiments, as noted above, structures and arrangements other than curved surfaces may be used to elastically deform the harrow member 5.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A link assembly for an agricultural ground engaging chain including a plurality of said link assemblies, the link assembly including:
   a first component having a first clamping portion and a first link portion for linking with a link portion of an adjacent link assembly;
   a second component having a second clamping portion and a second link portion for linking with a link portion of an adjacent link assembly;
   a resilient harrow member, wherein the resilient harrow member is elastically deformable; and
   at least one fastening element;
   wherein, when the link is assembled:
   the resilient harrow member is clamped between the first clamping portion and the second clamping portion under an applied pressure, elastically deforming to enable engagement of the at least one fastening element, whereby upon release of the applied pressure, the resultant elastic stress in the harrow member urges the first and second components to bear against the fastening element to retain the components of the link assembly together.

2. The link assembly according to claim 1, wherein the harrow member has a first side and an opposite second side wherein when the link assembly is assembled, the first side faces the clamp portion of the first component and second side faces the clamping portion of the second component.

3. The link assembly according to claim 2, wherein the first link portion and the second link portion are located adjacent respective first and second sides of the harrow member.

4. The link assembly according to claim 2, wherein the harrow member is substantially dish-shaped with the first side having a concave surface, and the second side having a convex surface.

5. The link assembly according to claim 4, wherein the first clamping portion has a convex surface to nest with the concave surface of the first side of the harrow member, and the second clamping portion has a concave surface to nest with the convex surface of the second side of the harrow member.

6. The link assembly according to claim 5, wherein the radius of curvature ($R_1$) of the convex surface of the first clamping portion is greater than the radius of curvature ($r_1$) of the concave surface of the first side of the harrow member, and the radius of curvature ($R_2$) of the concave surface of the second clamping portion is greater than the radius of curvature ($r_2$) of the convex surface of the second side of the harrow member.

7. The link assembly according to claim 5, wherein the radius of curvature ($R'_1$) of the convex surface of the first clamping portion is less than the radius of curvature ($r'_1$) of the concave surface of the first side of the harrow member, and the radius of curvature ($R'_2$) of the concave surface of the second clamping portion is less than the radius of curvature ($r'_2$) of the convex surface of the second side of the harrow member.

8. The link assembly according to claim 2, wherein the harrow member is substantially disc-shaped.

9. The link assembly according to claim 8, wherein the first clamping portion has a convex surface for facing the first side of the harrow member, and the second clamping portion has a concave surface for facing the second side of the harrow member.

10. The link assembly according to claim 2 wherein the harrow member includes one or more relief cuts to aid deformation of the harrow member.

11. The link assembly according to claim 10, wherein the relief cut is in the form of a cross shaped aperture extending from the first side to the second side of the harrow member.

12. The link assembly according to claim 10, further comprising relief apertures at radially distal ends of the relief cuts, wherein the relief apertures are substantially circular or elliptical.

13. The link assembly according to claim 1, wherein the first and second link portions are formed of a hook portion or a loop portion.

14. The link assembly according to claim 13, wherein the first link portion is a hook portion and the second link portion is a loop portion.

15. The link assembly according to claim 13, wherein the hook portion further includes a bore for receiving a retaining pin, wherein when the link assembly is assembled, a first part of a retaining pin is located in the bore and a second part of the retaining pin extends from the bore to reduce or close a gap of the hook portion.

16. A link assembly for an agricultural ground engaging chain including a plurality of said link assemblies, the link assembly including:
   a first component having at least one first fastener receiving passage, a first clamping portion, and a first link portion for linking with a link portion of an adjacent link assembly;
   a second component having at least one second fastener receiving passage, a second clamping portion, and a second link portion for linking with a link portion of another adjacent link assembly;
   a resilient harrow member, wherein the resilient harrow member is elastically deformable; and
   at least one fastener having a shaft extending along a central shaft axis;
   wherein when the link assembly is assembled:
   the shaft is located, at least in part, through the first and second fastener receiving passages; and the resilient harrow member is elastically deformed between clamping portions of the first and second components such that the resultant elastic stress in the harrow member causes wall portions of each of the first and second fastener receiving passages to urge against the shaft towards the shaft axis to increase the maximum static frictional force between the wall portions of the first and second fastener receiving passages and the shaft.

17. The link assembly according to claim 16, wherein:
the first component includes a projecting portion opposite the first link portion, wherein the first fastener receiving passage is disposed in the projecting portion,
the harrow member includes an aperture,
wherein when the link assembly is assembled, the first component passes through the harrow aperture, and the projecting portion and the first fastener receiving passage is located adjacent the second side of the harrow member.

18. The link assembly according to claim 17, wherein:
the second component includes a socket opposite the second link portion, wherein the socket is adapted to receive at least part of the projecting portion,
wherein when the link assembly is assembled, at least part of the projecting portion is located in the socket with the first and second fastener receiving passages aligned for locating the shaft.

19. An agricultural ground engaging chain including a plurality of the link assemblies according to claim 1.

* * * * *